Aug. 15, 1933.  G. VAGLER  1,923,005
MACHINE FOR UNITING LOOPED FABRICS
Filed June 16, 1931  11 Sheets-Sheet 2
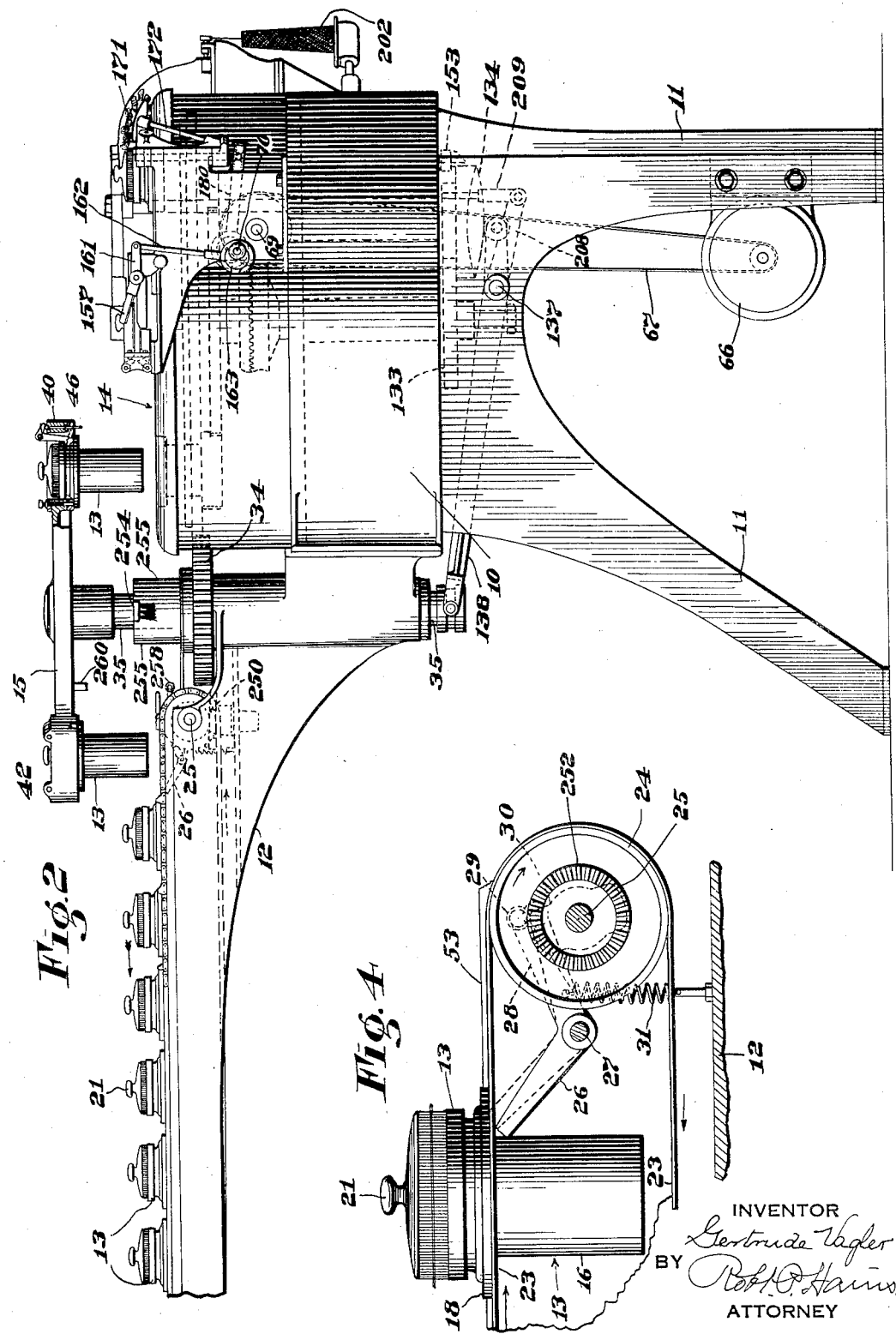
INVENTOR
Gertrude Vagler
BY
Robt. O. Harris
ATTORNEY

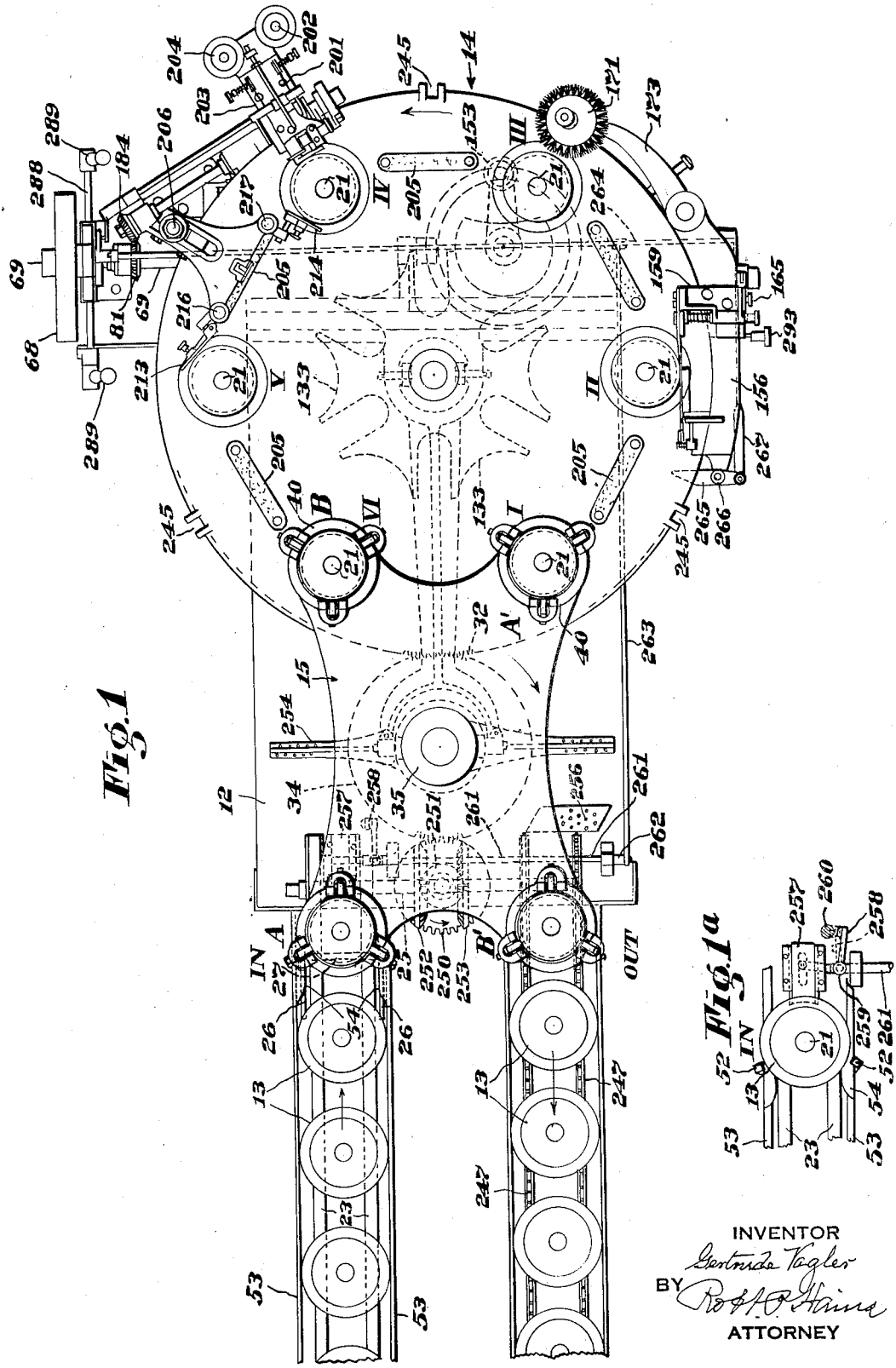

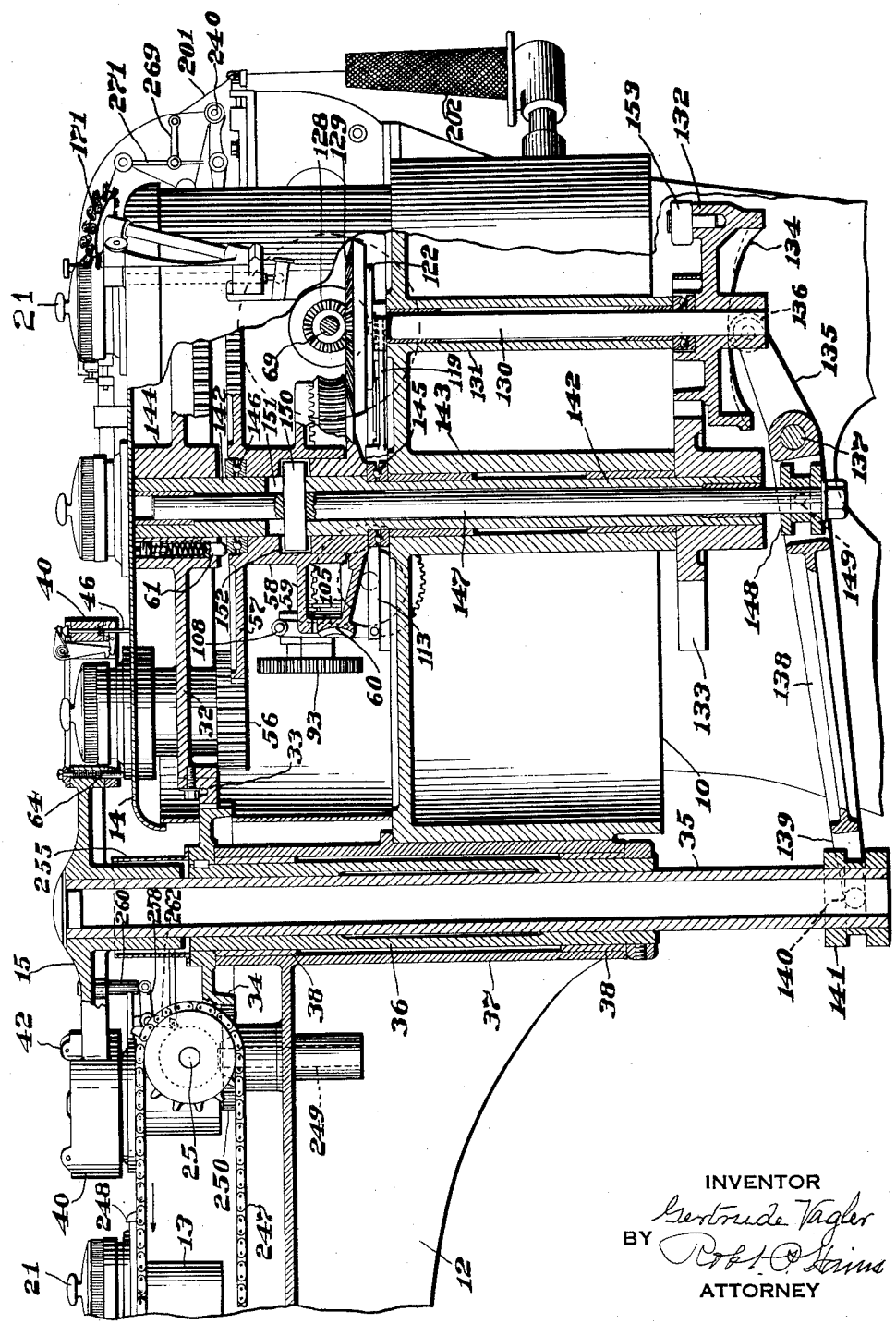

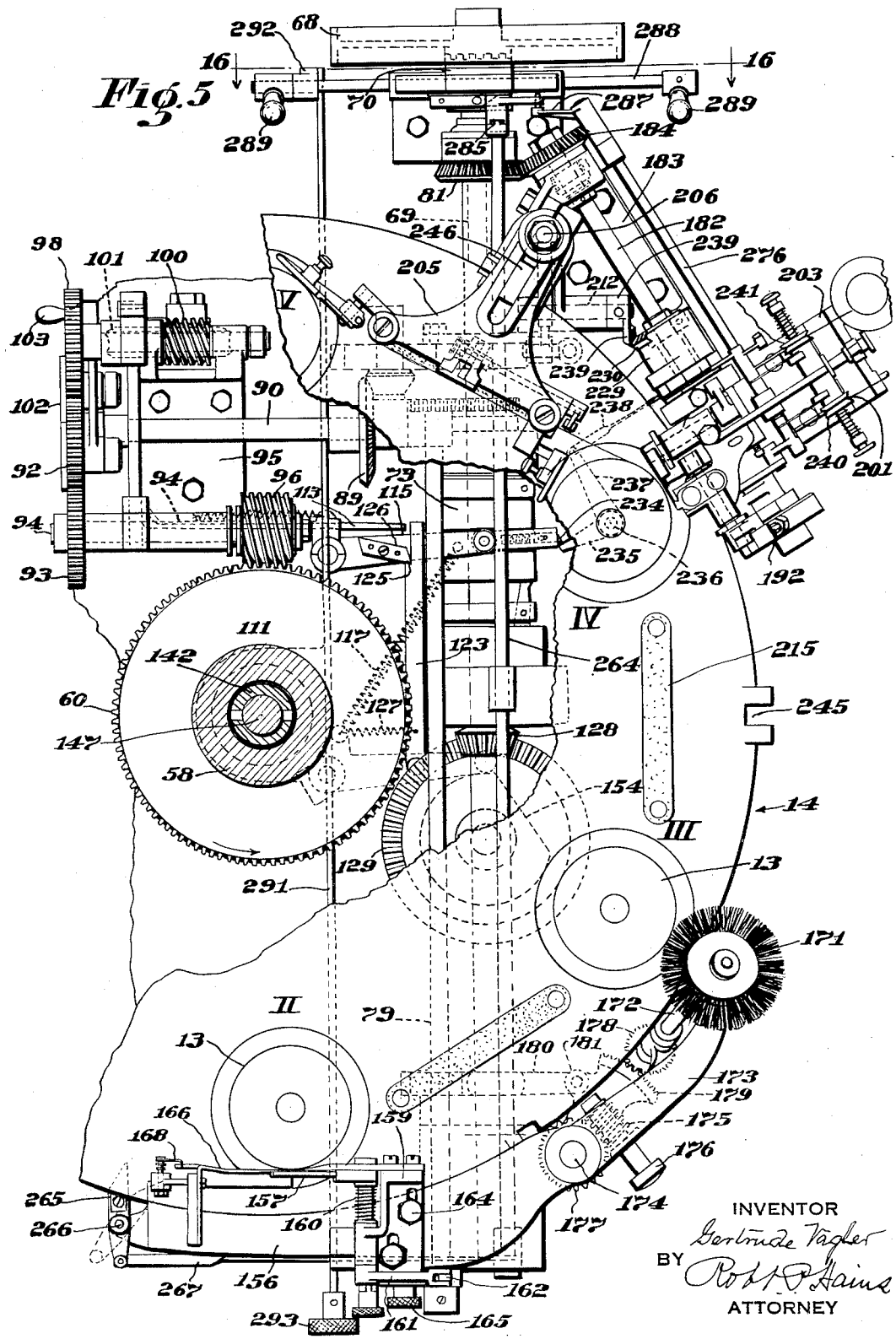

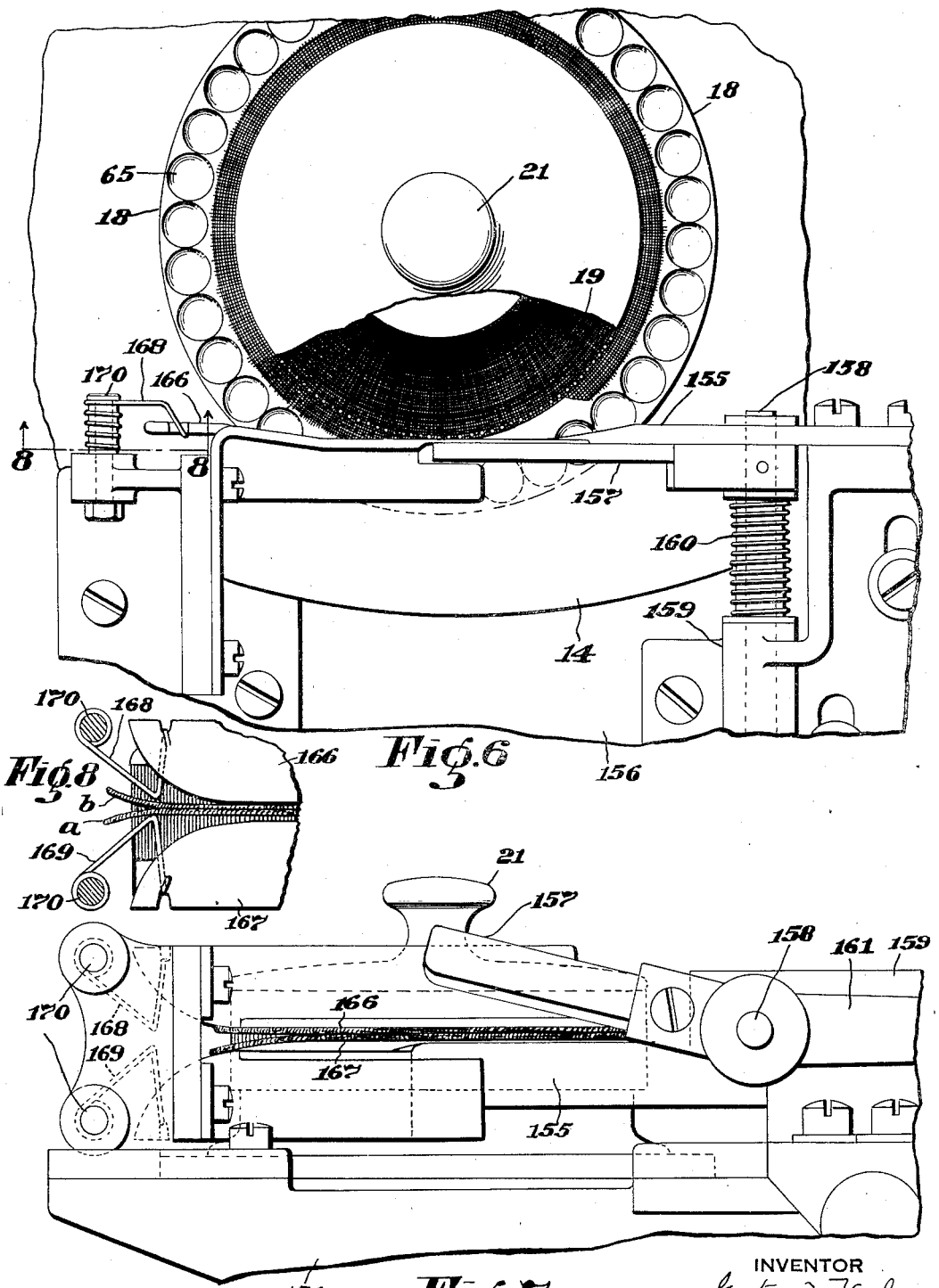

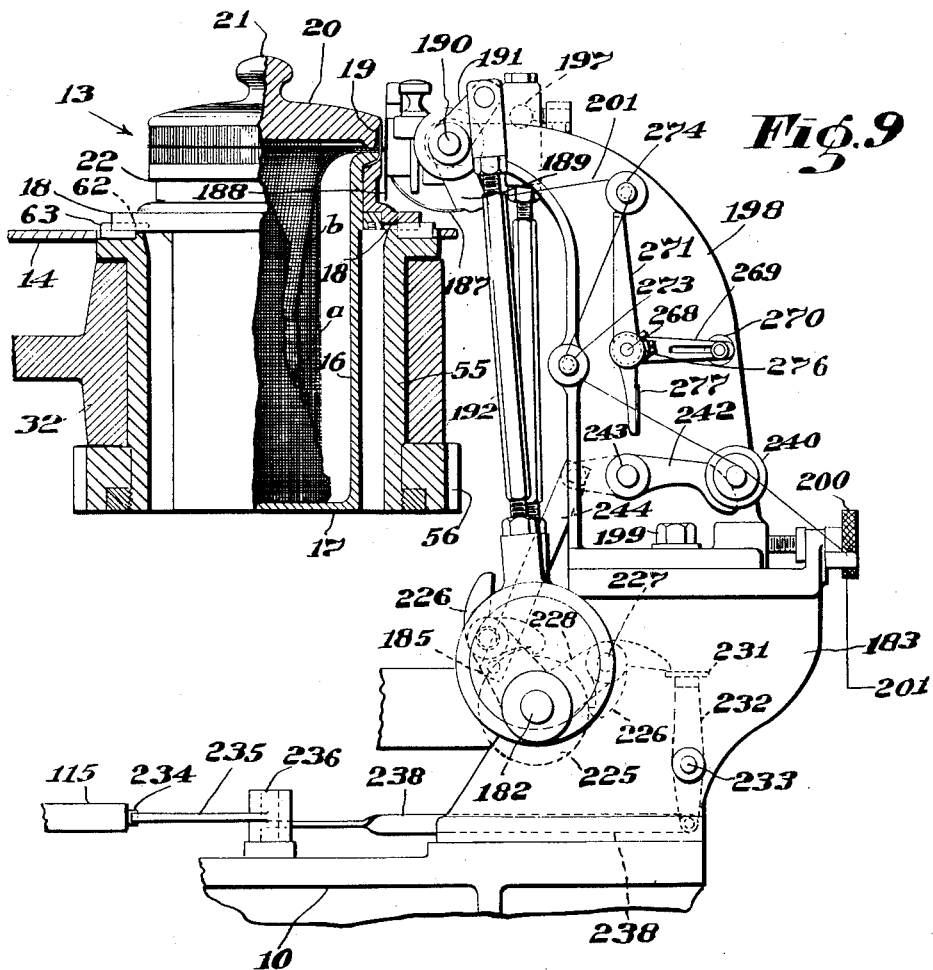
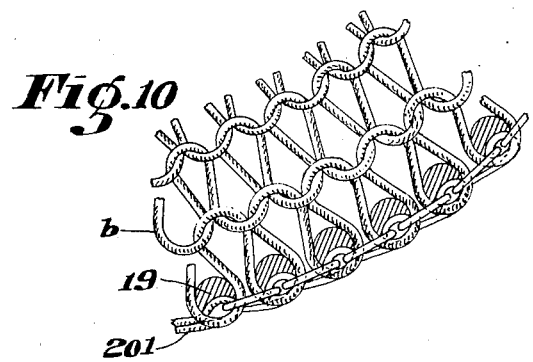

Aug. 15, 1933.  G. VAGLER  1,923,005
MACHINE FOR UNITING LOOPED FABRICS
Filed June 16, 1931   11 Sheets-Sheet 7
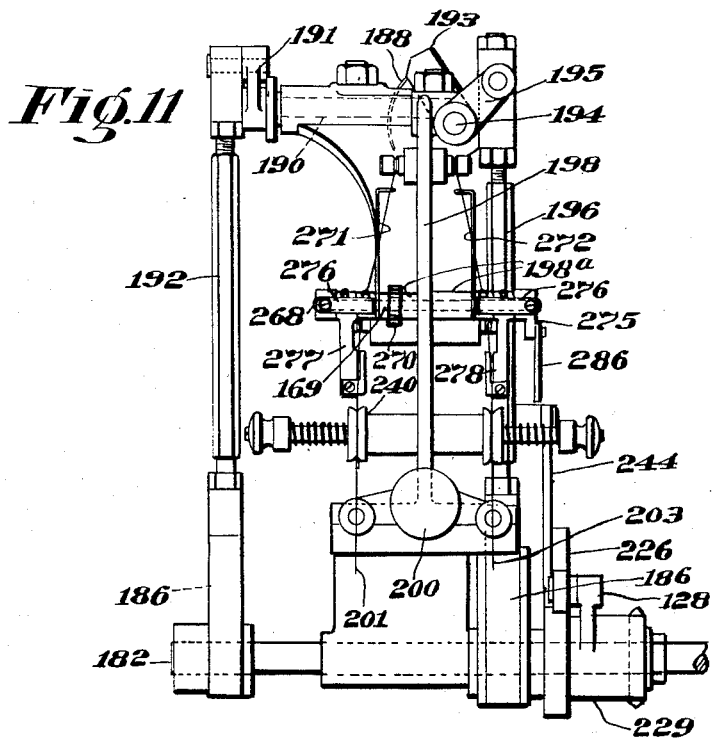
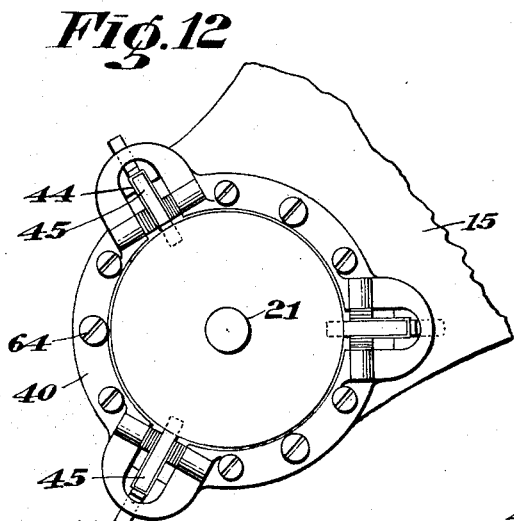
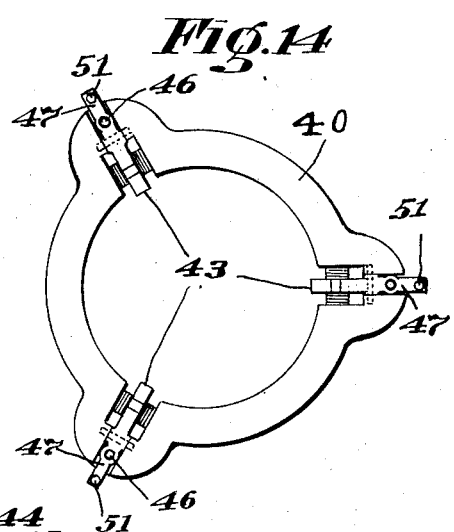
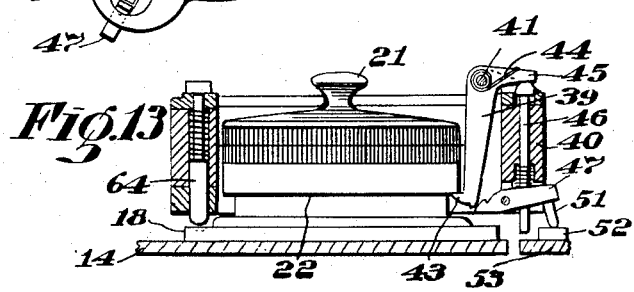
INVENTOR
Gertrude Vagler
BY
Robt. P. Adams
ATTORNEY Aug. 15, 1933.　　　　G. VAGLER　　　　1,923,005
MACHINE FOR UNITING LOOPED FABRICS
Filed June 16, 1931　　11 Sheets-Sheet 8
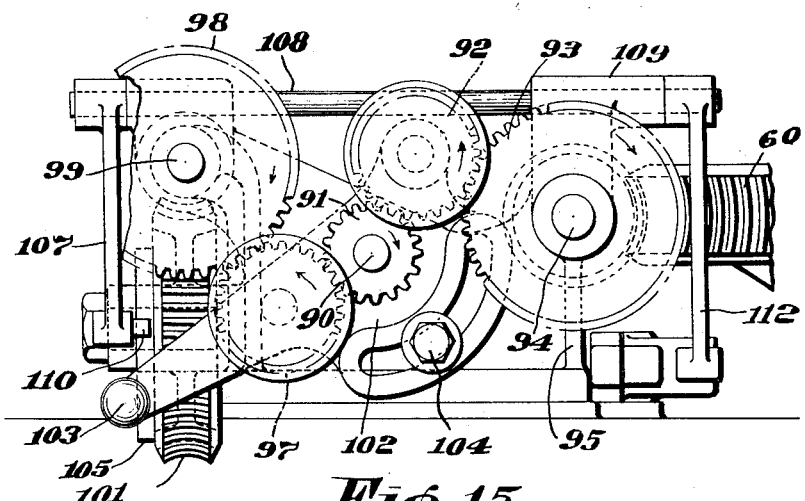
Fig.15
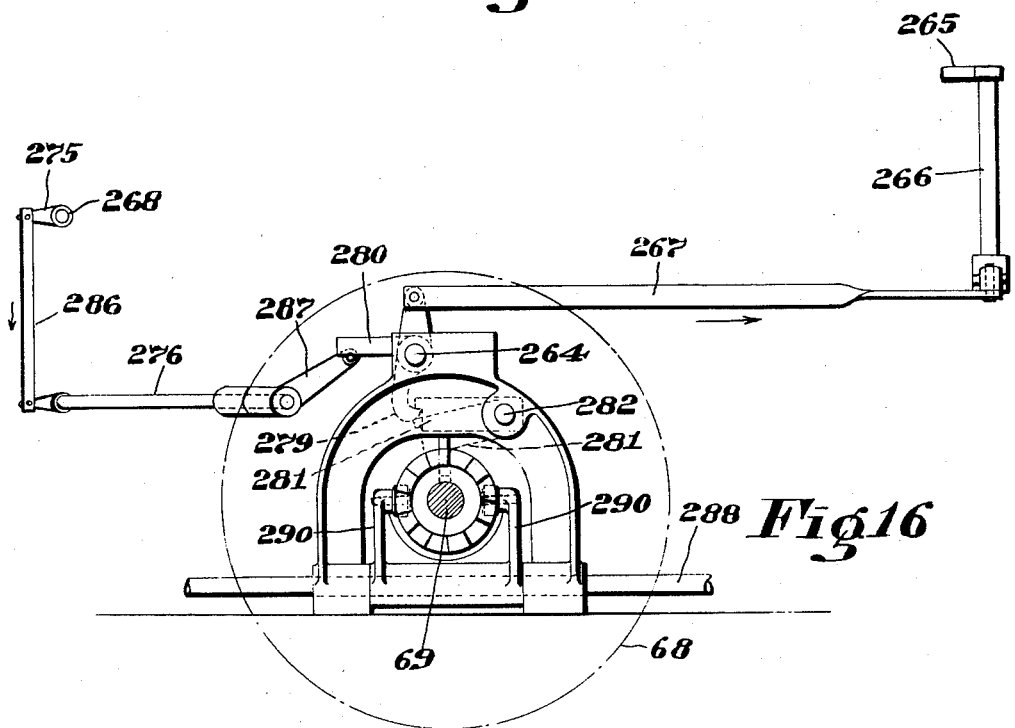
Fig.16
Fig.17
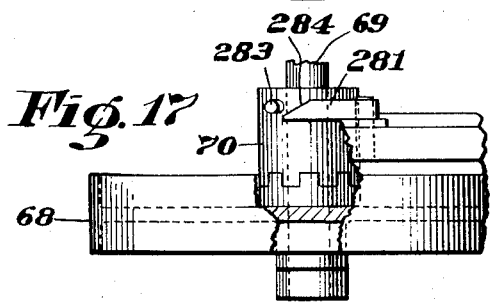
INVENTOR
Gertrude Vagler
BY
Robt. S. Hains
ATTORNEY Aug. 15, 1933.  G. VAGLER  1,923,005
MACHINE FOR UNITING LOOPED FABRICS
Filed June 16, 1931  11 Sheets-Sheet 9
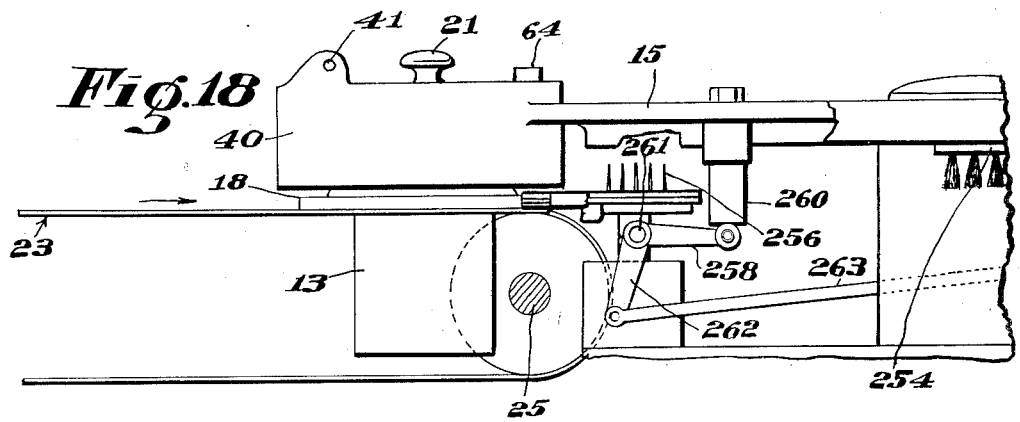
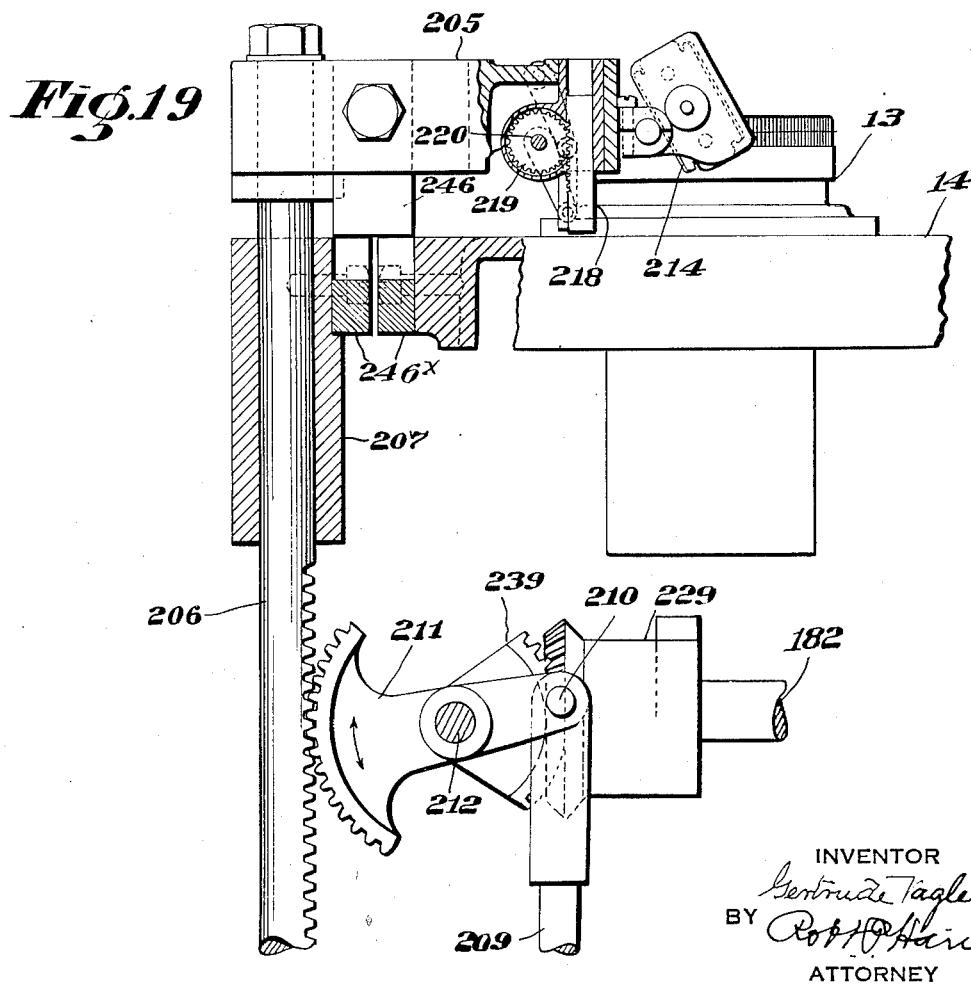
INVENTOR
Gertrude Vagler
BY Rob H Harris
ATTORNEY Aug. 15, 1933.    G. VAGLER    1,923,005
MACHINE FOR UNITING LOOPED FABRICS
Filed June 16, 1931    11 Sheets-Sheet 10
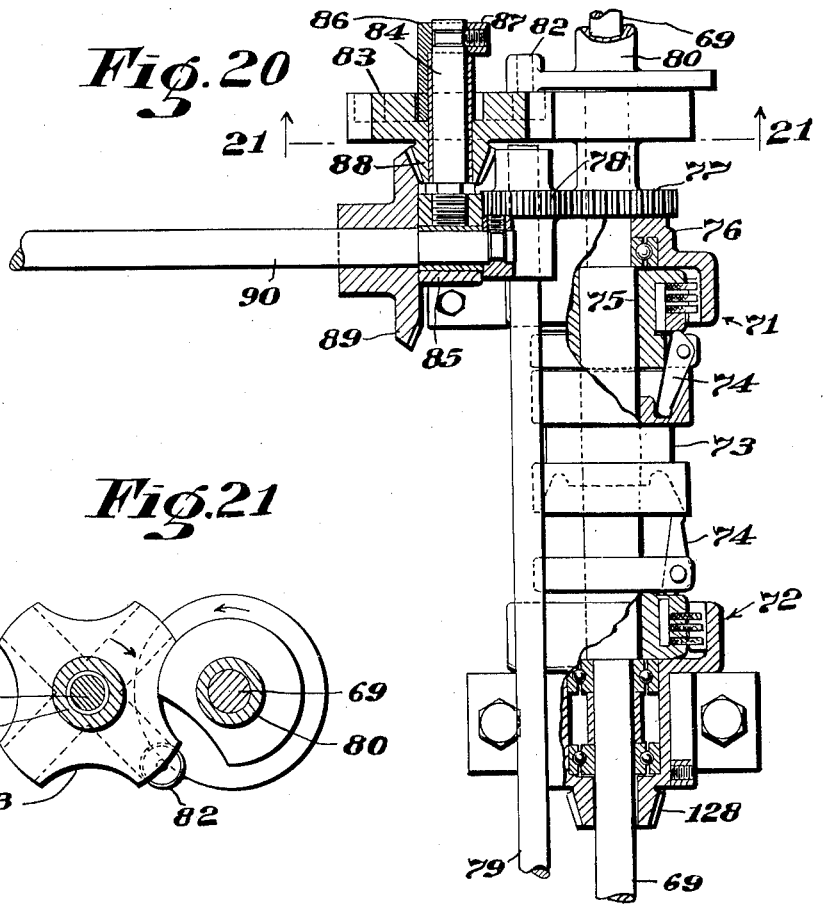
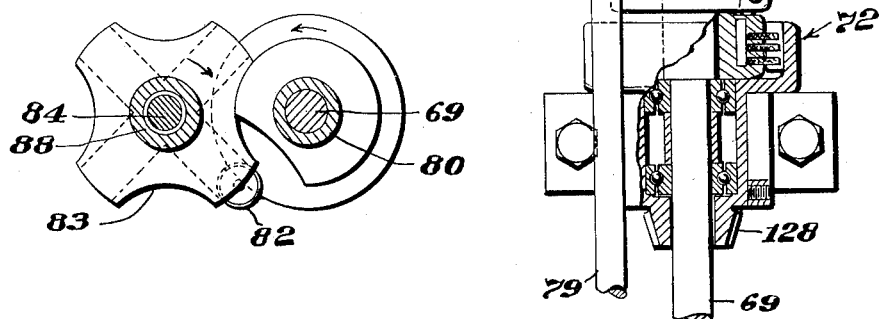
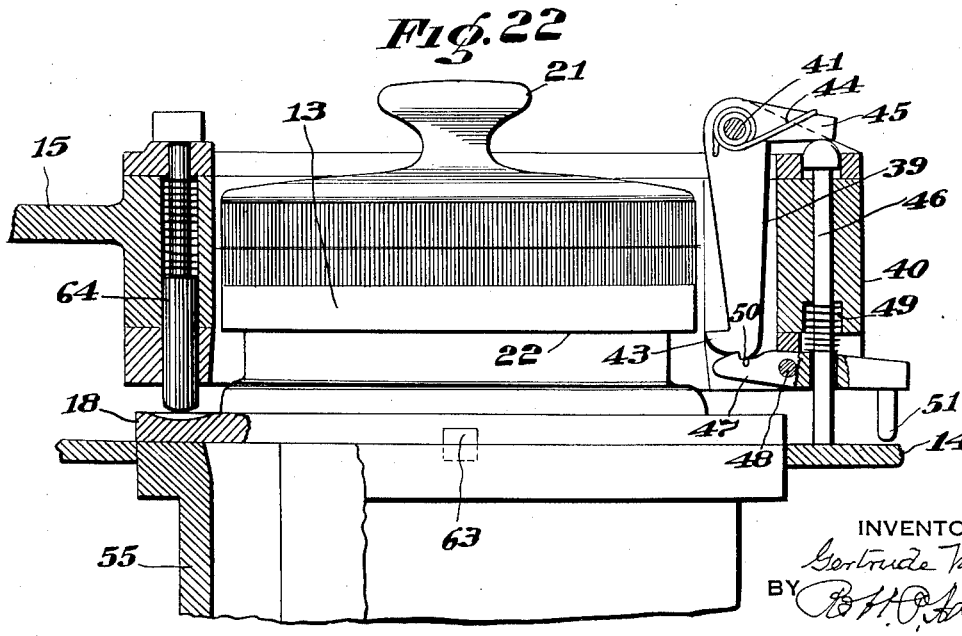
INVENTOR
Gertrude Vagler
BY
ATTORNEY

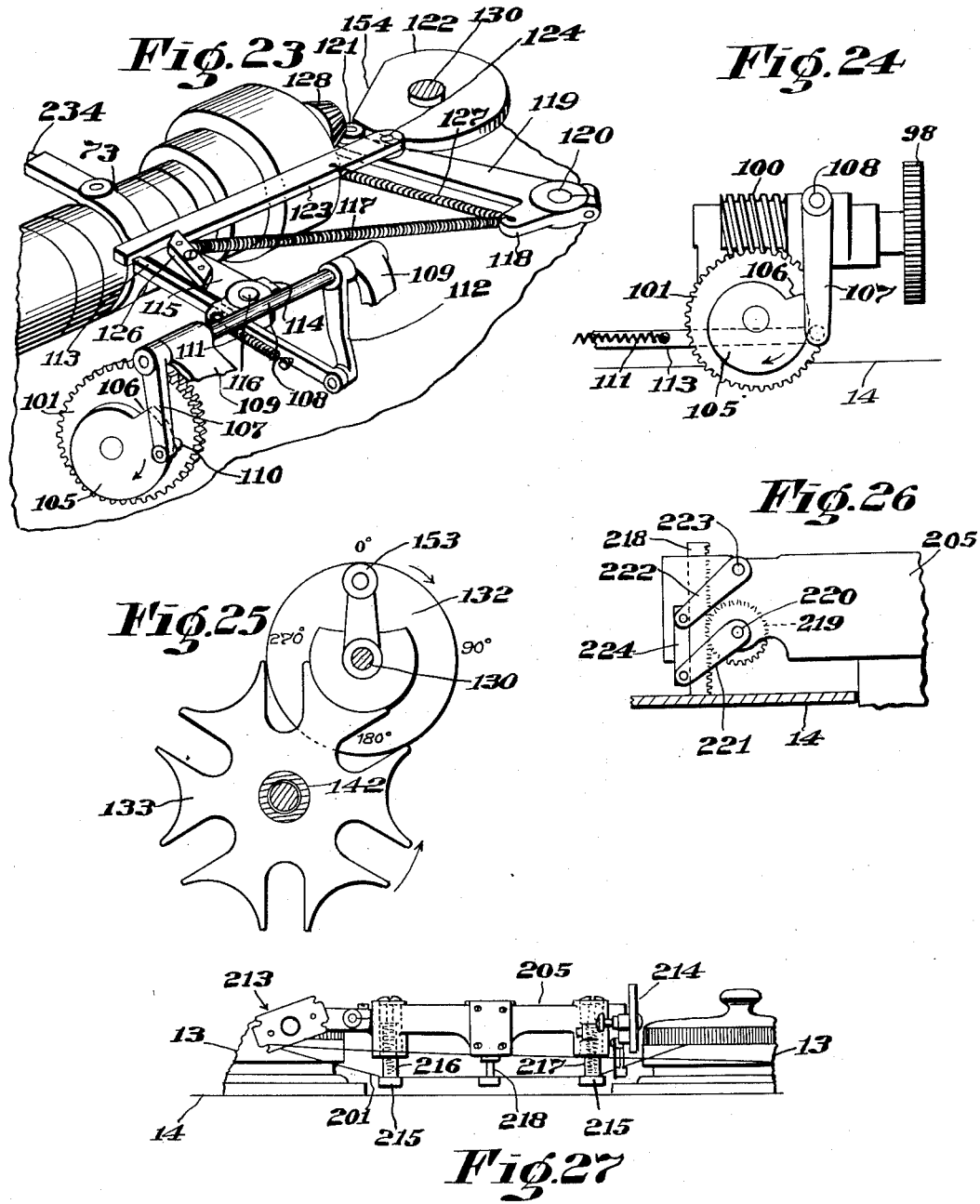

Patented Aug. 15, 1933

1,923,005

UNITED STATES PATENT OFFICE 1,923,005

MACHINE FOR UNITING LOOPED FABRICS

Gertrude Vagler, Brooklyn, N. Y., assignor to Sulloway Mills, Franklin, N. H., a Corporation of New Hampshire Application June 16, 1931. Serial No. 544,799

53 Claims. (Cl. 112—25)

This invention relates to machines provided with looping mechanism for uniting knitted or other looped fabrics, and pertains more particularly to an automatic machine adapted to perform automatically the various operations involved in uniting successive pieces of work.

The machine of the present invention is designed more particularly to unite the body and upper of hosiery but may be employed to unite other looped fabrics. Such uniting or looping operation has been performed heretofore by placing the body of a sock and the upper or cuff, in an annular head or cylinder so that the portions of the hosiery to be united are supported by impaling pins projecting from the head.

The annular head provided with the portions of the hosiery to be united is then presented to stitching or looping mechanism having a needle operable to place the uniting thread about the pair of fabric loops supported by each impaling pin, and it has been proposed heretofore to provide adjacent the looping mechanism a rotating carrier or turret, adapted to present the heads successively to the stitching or looping mechanism. It has also been proposed heretofore to provide means for trimming the fabric and for brushing away the trimmed portions before the fabric carried by the head is presented to the stitching or looping mechanism.

The uniting or looping machines proposed heretofore, however, have been only partially automatic in that heretofore each time the operation of uniting the fabrics carried by a head has been completed, the services of a machine attendant have been required to remove the finished head from the stitching mechanism and initiate the stitching operation upon the next head presented by the carrier or turret.

The present invention contemplates a machine which is adapted to perform automatically all of the operations involved in uniting the fabrics upon successive heads so that all that is necessary is to supply the heads having the portions of the fabric to be united held by the impaling pins to conveyor belts, whereupon the machine of the present invention will perform automatically the operations of delivering the heads successively to a rotating carrier or turret, which is moved periodically to present each head successively to trimming, brushing, and looping mechanism, and after the looping operation is completed upon a head it is automatically removed from the carrier or turret.

In accordance with the present invention the fabric carrying heads are rotatably supported by a carrier or turret which is rotated periodically through a sufficient angle to advance the heads from one operating point or station to another, and means is provided for rotating each head relative to the looping mechanism and other mechanism provided to operate on the fabric support by the heads. In order to perform automatically the various operations involved in handling the heads and uniting successive pieces of work carried by the heads, it is necessary to employ different groups of cooperating devices and to provide means for operating these separate groups of devices in timed relation with each other.

One important feature of the present invention resides in means for automatically operating the carrier or turret; another in means for rotating the heads; a third in means for automatically suspending one of these operations while the other is being performed; a fourth in means for holding the carrier in a fixed position while the stitching and other operations performed on the rotating heads are being completed; and a fifth in means for arresting the rotation of the heads while the carrier or turret is being rotated.

Another feature of the present invention resides in sleeves rotatably mounted upon the carrier or turret and adapted to have the annular heads inserted therein so that they will be rotated by the sleeves.

Another feature of the present invention resides in transfer mechanism adapted to convey the heads to be operated upon from a point of supply to the carrier, and also to remove the heads which have been operated upon from the carrier.

In order to perform the stitching or looping operation automatically upon the successive heads care must be taken not to prematurely break or cut the thread of the needle during the operation of indexing or moving a completed head away from the stitching mechanism. In accordance with the present invention the thread supplied by the uniting needle is not cut until after a head having the thread attached thereto is moved away from the looping mechanism and another head is presented thereto and the looping mechanism has been initiated. To accomplish this it is important that the sewing needle and also the looping needle, provided both needles are employed, are positioned at this time so that the thread may pass freely through the eyes of these needles.

This desirable operation is secured in accordance with the present invention by providing means adapted to bring the needles to rest in a predetermined position upon the completion of the uniting operation. In carrying out this feature of the present invention means are provided for engaging a part upon the needle operating shaft, upon completion of the uniting operations, to rotate the shaft in the reversed direction to thereby disengage the needles from the work and from the thread loops so that the threads will pull freely through the eyes of the needles during the indexing operation.

Another feature of the present invention resides in means for automatically severing the threads adjacent the work supporting heads.

Further features of the invention reside in stop mechanism for stopping the operation of the present machine in case any one of several defects occur during the machine operation. More particularly these features of the machine reside in the following safety stop mechanisms:

(1) Means adapted to stop the machine in case an annular head is not supplied at the transfer receiving point ready to be conveyed by the transferrer to the carrier or turret.

(2) Means for stopping the machine in case a head is not properly positioned upon the rotating carrier or turret.

(3) Means for stopping the machine in case a thread supplied to the needle or to the looper breaks or becomes too slack; and (4) Means for stopping the machine in case a knot is formed in the thread supplied to either needle.

Other features of the invention and novel combination of parts in addition to the above will be hereinafter described in connection with the accompanying drawings, which illustrate one good practical form of the invention.

In the drawings:—

Fig. 1 is a top plan view of the machine constructed in accordance with the present invention.

Fig. 1ª is a top plan view of stop mechanism provided at the point where the heads are delivered to the transferrer.

Fig. 2 is a side elevation of the machine of Fig. 1.

Fig. 3 on an enlarged scale is a vertical sectional view with parts in section through the major portion of the machine shown in Fig. 1.

Fig. 4 is a vertical sectional view through the supporting shaft for the belts that deliver the heads to the transferrer.

Fig. 5 on an enlarged scale is a top plan view with parts broken away of part of the rotating turret and associated mechanism.

Fig. 6 on an enlarged scale is a top plan view of a head and associated trimming mechanism.

Fig. 7 is a side view of the mechanism shown in Fig. 6.

Fig. 8 is a sectional view taken substantially on the line 8—8 of Fig. 6 and shows means for straightening the portions of the fabric to be trimmed.

Fig. 9 is a side elevation of the stitching mechanism, the adjacent head being shown partly in section.

Fig. 10 on an enlarged scale is a horizontal sectional view of the impaling pins showing the looped fabric engaged therewith.

Fig. 11 is a rear view of the stitching mechanism of Fig. 9.

Fig. 12 is a top plan view of one of the four head engaging devices provided upon the transferrer.

Fig. 13 is a vertical sectional view of Fig. 12;

Fig. 14 is a bottom plan view of the parts of the transferrer shown in Fig. 12;

Fig. 15 is a face view looking towards the change gears of Fig. 5;

Fig. 16 is a sectional view taken on the line 16—16 of Fig. 5;

Fig. 17 is a top plan view with parts in section of a driving pulley that operates the machine;

Fig. 18 is a side view with part in section showing a portion of the transferrer in engagement with a head supplied by the infeed belts;

Fig. 19 is a side view with parts in section of the thread severing means;

Fig. 20 is a top plan view with parts in section of the twin clutches provided upon the main operating shaft;

Fig. 21 is a sectional view taken on the line 21—21 of Fig. 20 and shows a Geneva gear drive for rotating the annular heads;

Fig. 22 on an enlarged scale is a vertical sectional view through one head engaging portion of the transferrer;

Fig. 23 is a perspective view of the twin clutch mechanism upon the main shaft and the clutch controlling means;

Fig. 24 is a face view of a clutch controlling cam and associated parts of Fig. 23.

Fig. 25 is a top plan view of the Geneva gear for indexing the carrier or turret, the operating shafts being shown in section.

Fig. 26 is a side view of slack producing mechanism to be described and which is carried by the thread severing head; and Fig. 27 is a face view of the head for supporting the thread cutting and clamping means.

It is apparent that the mechanisms for carrying out the features of the present invention may be variously constructed and in the embodiment of the machine shown the various operating parts are supported by a main frame or casting 10, which is supported at the desired height from the floor by the legs 11 and the frame 10 is shown as having a laterally extending structure 12 adapted to support the means for supplying the annular heads to the machine and for conveying them therefrom. The annular heads 13 are conveyed from the supply belts, to be described, to a rotating carrier or turret 14 by the revolving transferrer 15.

While the carrier or turret 14 may be constructed to support any desired number of heads 13 and to advance them successively to the different stations or operating points, the carrier illustrated is provided with six head receiving portions disposed 60° apart and as a result the carrier or turret 14 is rotated through one sixth of a complete revolution each time it is indexed to advance the heads from one operating point to another. The different stations, or operating points, are numbered upon the drawings as I to VI inclusive in the order in which the heads are advanced to these different stations. In the embodiment of the invention shown the heads 13 to be operated upon are deposited by the transferrer 15 upon the carrier or turret at station No. I, they are trimmed at station No. II, and at station No. III a rocking brush is provided for removing the trimmings from the portions of the fabric. The stitching or looping operation takes place at station No. IV. At station No. V the uniting threads extending from the finished head are severed and at station No. VI the finished head is removed from the carrier, or turret.

In the construction shown each annular head 13 has the cylindrical portion 16 which is closed at its lower end as at 17, and each head is provided near its upper end with an annular flange 18 adapted to support the head while it is mounted upon the carrier or turret. Extending upwardly from the upper end of the head are a large number of impaling pins 19, there being as many pins as there are loops in each fabric to be united. The portions of the body $a$ of the sock or hosiery, and the portion $b$ of the cuff are engaged with the impaling pins, as shown in Fig. 9, and the remaining portion of the fabrics $a$ and $b$ are pushed down inside of the hollow head out of the way, as shown in Fig. 9. The fabrics $a$ and $b$ are conveniently held throughout the various operations from being forced upwardly, out of engagement with the impaling pins 19 by providing the weight 20, the outer annular portion of which fits inside of the row of impaling pins, as will be apparent from Fig. 9, and the weight 20 preferably has a knob 21 extending upwardly therefrom to facilitate handling the weight. Each head 13 is further provided with an annular shoulder 22 adapted to be engaged by pawls, to be described, to facilitate the placing of the heads upon the carrier or turret and the removal of the heads from the turret.

The present invention contemplates that several or a number of the heads 13 provided with the portions of a sock or stocking to be united will be placed from time to time upon the feed belts 23 so that the annular flange of each head rests upon the upper run of the feed belts while the body of the head extends downwardly between the spaced belts, as shown in Fig. 4. In this manner any desired number of heads may be advanced towards the "in" position, shown in Fig. 1, ready to be conveyed from this position by the transferrer 15 to the station I of the revolving carrier. The belts 23 pass around and are driven by the pulleys 24 rotatably supported by the shaft 25 and these belts may be supported intermediate their ends by any suitable means, not shown. The arrangement is such that the heads 13 will be advanced by the belts 23 in the direction indicated by the arrows until their travel in this direction is arrested by stops to be described, whereupon the belts will continue to travel relative to the heads supported thereby.

It is important that means be provided to insure that a head 13 will arrive at the "in" position before the transferrer 15 is lowered to engage such head, since it is obvious that the machine might be damaged if the transferrer 15 should be lowered before a head had reached the final "in" position. In order to prevent this the present invention contemplates the use of the laterally spaced stops 26, which are rigidly secured to the rock shaft 27, provided with the operating arm 28. This arm is provided at its outer end with a roller 29 adapted to cooperate with a cam 30 rigidly secured to the belt operating shaft and this cam has the oppositely extending raised portions, shown in Fig. 4. The arm 28 is continuously urged in a downward direction by the spring 31. The arrangement is such that the upper end of the stops 26 normally occupy the position in which they are shown in dotted lines in Fig. 4 so as to engage the flange 18 of a head 13 being advanced towards the "in" position, and serve to arrest this head before it has been advanced far enough by the belts 23 to be struck by the transferrer 15 when the latter is lowered. As soon as the cam 30 has been rotated sufficiently to lower the stops 26 the head just mentioned will be released and will be advanced by the belts 23 to the "in" position before the transferrer 15 is again lowered. The travel of the belts 23 is sufficiently fast to insure the movement of a head from the position in which it is arrested by the stops 26 to the "in" position between the successive lowering of the transferrer 15.

The transferrer 15, in accordance with the present invention performs the double function of delivering heads 13 to the rotating carrier and of removing them therefrom, and in order to accomplish this the transferrer 15 is given the construction, best shown in Fig. 1, in which it will be seen that the transferrer is provided with four head supporting portions or rings indicated upon the drawings by A, A', B, and B'. The arrangement is such that the transferrer normally remains in the lowered position in which it is shown in Fig. 3 so that each of these four head receiving portions surrounds or embraces a head 13, and when the time arrives for conveying a head from the "in" position to the station I of the turret and for conveying at the same time a completed head from the VI position to the "out" position, the transferrer is raised to the position in which it is shown in Fig. 2 and is then rotated through an angle of 180°, whereupon the transferrer is lowered to deliver one head supported thereby to the carrier or turret and the other head carried thereby to the "out" position. As above stated the revolving carrier or turret 14 is rotated through successive angles of 60°, and this angular rotation of the turret is utilized to turn the transferrer 15 through an angle of 180°. This is accomplished by providing below the covering shell or table 14 of the turret the annular casting 32 to which casting is rigidly secured the large ring gear 33 and this ring gear meshes with a smaller gear 34 adapted to rotate the transferrer 15, the size of the gears 33 and 34 being such that rotation of the turret 14 through an angle of 60° will turn the transferrer 15 through an angle of 180°.

The transferrer 15, in the construction shown, is rigidly secured to and is operated by the hollow shaft 35. This shaft is mounted for vertical sliding movement in the sleeve 36 which sleeve is rotated by the gear 34, above mentioned, and the shaft 35 is keyed to the sleeve 36 to cause the rotating movement of the sleeve to be imparted to the shaft. The sleeve 36 is journaled in a hollow casting or bearing casing 37, which is rigidly secured to the frame 10 and the bearing rings 38 are preferably provided between the sleeve 36 and its supporting casing 37.

As above stated, the transferrer 15 is lowered over the heads to be lifted thereby so that when the transferrer is again raised, as shown in Fig. 2, by forcing the shaft 35 upwardly the heads 13 will be supported clear of the mechanism of the machine to permit the rotation of the transferrer. The means shown in the drawings for causing the transferrer to pick up the heads comprises the pawls 39, disposed at an angle of 120° to each other about each annular holder or portion 40 of the transferrer 15. These pawls are pivotally supported near their upper ends by the pivot pins 41 mounted in the ears 42 of the transferrer. Each pawl 39 is provided near its lower end with a projection 43 adapted to engage under the annular shoulder 22 of a head 13 and each pawl is continuously urged towards the shoulder engaging position by a spring 44 which acts downwardly upon a laterally extending arm 45 of the pawl, see Figs. 13 and 22.

As above stated, each of the four holders or head receiving rings 40 of the transferrer 15 is provided with three pawls 39, but the operation of these pawls is different at the positions A', B' from that at A, B, since the arrangement is such that when the transferrer 15 is lowered the pawls 39 at the positions A and B engage under the shoulder 22 of a head 13 to raise the head, whereas the pawls 39 at the positions A', B' are at this time retracted to release the heads.

In order to secure the proper operation of the pawls 39 at each of the four positions just mentioned the pawls are provided with the pawl retracting pins 46 slidably mounted in the ring 40 and positioned so that the head of the pin will engage the under face of an arm 45 as best shown in Fig. 22. It is desirable at times to retain the pawls 39 in their retracted position. The pawl holding latches 47 are therefore provided and are pivotally supported at 48. These latches are provided with the compressed springs 49 adapted to engage the inner end of each latch with a lip 50 at the lower end of a pawl, to hold the pawl retracted. The pawl releasing pins 46 are so constructed that when these pins are moved to the position A' of Fig. 1 they will abut against the surface of the turret 14, as shown in Figs. 3 and 22 to retract the pawls, and likewise when these pins 46 occupy the position B' their lower ends will strike upon fixed surfaces, not shown, to retract the pawls.

The pawls 39 at the position A are held retracted by the latches 47 while the transferrer is being lowered and as the transferrer reaches its lowermost position the latches 47 are tripped by the engagement of their outer ends 51 with the fixed blocks 52 so as to release the pawls, see Fig. 13. At the same time the pawls at the B position, which are likewise held retracted by the latches 47, will be released by causing the downwardly extending tail 51 of these latches to strike against similar raised blocks 52 provided upon the upper surface or table 14 of the turret. As a result of the construction just described the lowering of the transferrer 15 will cause the pawls 39 to engage the heads 13 at positions A, B, and to release the heads at positions A', B'.

Two of the three blocks 52 at the A position may be mounted upon the guide bars 53 disposed adjacent the conveyor belts 23. The guides 54 adapted to center each head 13 as it moves into the A position may also be supported by the guide bars 53, as shown in Fig. 1ª.

The heads 13 when placed upon the annular carrier or turret 14 should be rotated at the different stations or operating points in order to cause the trimming mechanism, the brushing mechanism, and stitching mechanism, to operate upon the portions of the fabric supported by each impaling pin, and while the desired results could be secured by imparting a continuous rotative movement to each head until the same has been rotated through a complete circle, the present invention contemplates a construction whereby each head is rotated step by step a distance corresponding to the spacing of the impaling pins so that the head being operated upon by the stitching mechanism is held still while the needle inserts a thread between an impaling pin and the loops supported thereby. The head is rotated while the needle is out of engagement with the impaling pin. This desired step by step rotation of the heads is secured in the embodiment of the invention shown by providing each head receiving portion or station of the turret with a head receiving sleeve 55 which is rotatably mounted in the casting 32 of the turret, see Fig. 9, and each sleeve is provided at its lower end with an operating gear 56. The gears 56 mesh with and are driven by the larger gear 57 mounted concentric with the central axis of the turret, and the gear 57 in the construction shown has the downwardly extending hub portion 58 and the laterally extending flange 59 provided at its lower face with teeth adapted to engage correspondingly shaped teeth formed upon the worm wheel 60. The gear parts 57, 58 and 59 are supported for vertical sliding movement and the flange 59 is normally held in engagement with the teeth of worm wheel depressed by the pressure of the spring operated plunger 61. When however, it is desired to index or rotate the turret 14 through an angle of 60° the gear parts 57, 58, and 59 will be raised by mechanism to be described, to permit these parts to rotate with the rotating turret while the worm gear 60 is held by its worm against rotation.

When a head 13 is lowered into its supporting sleeve 55 it is desirable to effect a positive locking engagement between the head and sleeve so that the rotation of the sleeve 55 will be positively imparted to the head supported thereby. This is accomplished in the construction shown by providing the under face of the flange 18 of each head with one or more key receiving slots 62, see Fig. 9, adapted to receive the correspondingly shaped key 63 rigidly secured to the sleeve 55. As a result of this construction it is necessary to effect a relative rotation between a head and the sleeve in which it is mounted to bring the key and slot into alignment with each other. This is accomplished by providing each ring portion 40 of the transferrer 15 with one or more spring operated plungers 64, see Fig. 22, and these plungers are adapted to engage the depressions 65 formed in the upper face of the flange 18, see Fig. 6. The arrangement is such that the plungers 64 will yieldingly hold a head 13 from rotating while the sleeve 55, in which it is mounted, is positively rotated step by step through the gear driving mechanism above mentioned, with the result that the key 63 will be gradually brought into alignment with a slot 62, whereupon the head will move downwardly away from the plungers 64 into positive locking engagement with the sleeve 55.

The mechanism so far described serves to advance the heads 13 to be operated upon to the "in" position, to transfer the heads from this position to the station I of the turret and to effect the positive rotation of the heads step by step while they are supported by the turret adjacent the different operating devices. Power means will now be described for indexing or periodically rotating the turret through successive angles of 60°.

In the construction shown all operating parts of the present machine are driven from an electric motor 66, supported by the legs 11 of the machine and power is imparted from the driving pulley of this motor by the belt 67 to a larger pulley 68 rotatably mounted on the horizontally extending shaft 69. The arrangement is such that the pulley 68 rotates freely upon the shaft 69 and is caused to rotate this shaft by manipulating a clutch 70 keyed to the shaft 69 and adapted to be moved into and out of engagement with the rotating pulley 68.

The power shaft 69 is employed to operate two distinct trains of mechanism, each of which, in the construction shown, employ a Geneva gear, one of which Geneva gears serves to rotate the heads step by step, as above pointed out, and the other Geneva gear serves to rotate the carrier or turret to present the heads successively to the different stations. These trains of mechanism in the construction shown are operated from the main shaft 69 by twin clutches 71 and 72, see Fig. 20. The clutch 71 rotates the heads 13, operates the trimming mechanism and brush, and operates the stitching or looping mechanism. The clutch 72 serves to rotate or index the turret 14, to raise and lower the transferrer, and to raise and lower thread cutting mechanism to be described, and the parts are so constructed that the mechanism controlled by one clutch remains inoperative while the mechanism controlled by the other clutch is operating.

The clutches 71 and 72 may be of well known construction and as shown comprise the intermediate actuating member or sleeve 73 adapted to be shifted to the left, see Fig. 20, to actuate the pivoted levers 74 of the clutch 71, and shifted to the right to actuate the pivoted levers 74, of the clutch 72. When the sleeve 73 is shifted to the left as shown in Fig. 20 it will cause the portion 75 of this clutch, which is keyed or otherwise secured to the main power shaft 69, to rotate the portion 76 of the clutch which is loosely journaled upon the shaft 69. The rotation of the portions 76 of the clutch 71 drives the gear 77 secured thereto which in turn rotates the gear 78 to drive a shaft 79 provided to operate the trimming mechanism and the brush to be described.

The portion 76 of the clutch 71 serves also to rotate the hollow shaft or sleeve 80 which is provided at its outer end with a bevel gear 81 adapted to drive the stitching or looping mechanism. The sleeve 80 serves also to rotate the male element 82 of the Geneva gear having the female element 83 rotatably mounted upon a stub shaft 84 supported by a bracket 85 mounted upon the main structure 10 of the machine. The element 83 of the Geneva gear is held from moving lengthwise of the shaft 84 in one direction by an annular shoulder near the base of this shaft, and is held from movement in the opposite direction by a sleeve or stop 86 secured to the shaft by the bolt 87. The element 83 of the Geneva gear has the bevel pinion 88 adapted to mesh with and drive the bevel gear 89 rigidly secured to the shaft 90, one end of which shaft is journaled in the bracket 85. The shaft 90 extends in a horizontal direction below the turret head 14 and is provided at its outer end with the gear 91, see Figs. 5 and 15. The gear 91 drives an idle gear 92 which meshes with and drives the change gear 93 secured to the shaft 94. The shaft 94 is rotatably supported by the bracket 95 and is provided at its inner end with the worm 96 which meshes with and drives the worm gear 60 above mentioned as provided to rotate the work supporting heads 13. It will be understood that since the shaft 90 is operated by a Geneva gear, a step by step rotative movement will be imparted to this shaft and all parts driven therefrom thus imparting the desired step by step rotative movement to the heads 13.

It is desirable to rotate the head 13 adjacent the stitching or looping mechanism through slightly more than one complete revolution to cause the looping stitches to overlap to prevent them from pulling out. This is accomplished in the embodiment of the invention shown by employing the gear 91 to drive a second group of gears, one of which operates a cam adapted to shift the member 73 of the twin clutch and effect indexing of the turret upon the completion of each uniting operation. To this end a second idle gear 97 is provided which meshes with the gear 91 and serves to drive the second change gear 98, which change gear is slightly larger than the change gear 93. The size of these change gears will depend upon the number of impaling pins of the heads 13, and the size of these gears may be varied to accommodate heads having any desired number of pins. If the change gear 93 is provided with, say, 48 teeth then the change gear 98 is provided with, say, 49 teeth, the result being that the shaft 94 driven by the gear 93 will be rotated through slightly more than one complete revolution while the shaft 99 is being rotated by the gear 98 through a complete revolution. The shaft 99 rotates a worm 100, see Fig. 5, which meshes with the worm wheel 101, see Fig. 24. The idle gears 92 and 97 are conveniently supported by the rocking bracket 102 which may be readily shifted by the handle 103 to accommodate different size change gears and the bracket 102 may be clamped in the desired position of adjustment by tightening the bolt 104. The worm wheel 101 is provided with a clutch controlling cam 105 having the stepped portion 106 and cooperating with this cam is the lever 107 rigidly secured to and extending downwardly from the rocking shaft 108 which shaft is journaled in the brackets 109. At the lower end of the lever 107 is provided a cam engaging pin or roller 110, the arrangement being such that the roller 110 is continuously urged against the cam 105 by a spring 111 and when the stepped portion 106 is rotated past the roller 110 the lever 107 will move to the left viewing Fig. 24. This will impart a similar rocking movement to the lever 112 secured to the opposite end of the shaft 108 and this will serve to impart a sliding movement to a rod 113 pivotally secured to the lower end of the lever 112 and supported for sliding movement by the fixed bracket 114.

The sliding sleeve 73 of the twin clutch is controlled by a yoke 115, one end of which is pivotally secured at 116 to the fixed bracket 114. The yoke 115 is continuously urged in a right hand direction viewing Fig. 5 by the spring 117, the lower end of which is connected to a lateral projection 118 provided upon a rocking lever 119, pivotally supported at 120 and the outer end of this lever is provided with a roller 121 adapted to cooperate with a cam wheel 122 carried by a vertical shaft to be described.

The yoke 115 is normally held in the position in which it is shown in Fig. 5 that is, in position to drive the clutch mechanism 71 by the bar 123, one end of which is pivotally secured at 124 to an intermediate portion of the lever 119 and this bar 123 is provided near its opposite end with a shoulder 125 adapted to engage a block 126 rigidly secured to the yoke lever 115, and the outer end of the bar 123 is continuously urged towards the block 126 by the spring 127.

The construction just described is such that as long as the clutch controlling levers remain in the position in which they are shown in Figs. 5 and 23 the portions 76 of the twin clutch will be driven, but when the cam 105 is rotated sufficiently in the direction indicated by the arrow in Fig. 24 to permit the lever 107 to swing to the right a corresponding movement will be imparted to the rod 113, the end of which rests against a face of the bar 123. This movement of the rod 113 will serve to move the shoulder of the bar 123 out of engagement with the block 126 upon the yoke lever whereupon this lever will be moved by the spring 117 in a direction to release the clutch 71 and engage the clutch 72, thus stopping one set of driving mechanism and starting the operation of a different set of driving mechanism.

The clutch 72 serves to drive a bevel pinion 128 that meshes with a bevel gear 129 rigidly secured to the upper end of the downwardly extending shaft 130 which shaft is journaled in a sleeve or tubular bearing 131, carried by the fixed frame 10. The shaft 130 is provided near its lower end with the male element 132 of a larger Geneva gear than above described and having the female element 133. The portion 132 of the Geneva gear is also provided with the cam 134 adapted to actuate the rocking arm 135 having the cam engaging roller 136. The arm 135 is rigidly secured to a horizontal extending shaft 137 journaled in brackets supported beneath the main frame 10 of the machine, and rigidly secured to the shaft 137 and extending therefrom in an opposite direction to that of the arm 135 is the lever 138. At the outer end of this lever is provided the yoke 139 having the pins 140 which project into a groove of a sleeve 141 rigidly secured to the lower end of the hollow shaft 35. The arrangement is such that when the arm 135 is forced downwardly by the cam 134 the lever 138 will be rocked upwardly to raise the transferrer 15 from its lowered position of Fig. 3 to its elevated position of Fig. 2.

The element 133 of the Geneva gear is keyed or otherwise rigidly secured to the upwardly extending hollow shaft 142 which is journaled in the central portion 143 of the main frame 10 and to the upper end of this hollow shaft is keyed or otherwise rigidly secured the hub 144 of the casting 32 of the rotating carrier or turret 14. The downward thrust of the shaft 142 under the weight of the turret is supported by the ball bearing 145, the upper ring of which bearing engages an annular shoulder upon the shaft 142, as clearly shown in Fig. 3. The worm gear 60, above mentioned, is rotatably mounted upon the shaft 142 above the ball bearing 145 and the gear hub or casting 58 is rotatably mounted upon the shaft 142 and is supported for limited sliding movement lengthwise of the shaft 142 to permit the teeth of the flange 59 to be moved into and out of engagement with the teeth of the worm gear 60, as above mentioned. The spring actuated plunger 61 above described presses downwardly upon the ball bearing 146 carried by the gear 57.

The main power shaft 69 is preferably driven at relatively high speed to operate the stitching or looping mechanism rapidly but it is desirable to effect the indexing of the turret at a slower speed and this is accomplished by employing a relatively small bevel pinion 128 to drive a larger gear 129 that operates the shaft 130 and lower Geneva gear. The turret 14, as above pointed out, is supported by and positively rotated by the hollow shaft 142 carrying the element 133 of the Geneva gear at its lower end. If desired worm gears may replace the bevel gears 128, 129.

It is important to provide means for holding the teeth of the elements 59 and 60 disengaged during the indexing of the turret 14. To this end in the construction shown a shaft 147 is mounted in the hollow shaft 142 for vertical sliding movement and the lower end of this shaft is provided with a grooved sleeve 148 adapted to receive operating pins 149 carried by the rocking lever 138. The shaft 147 is provided near its upper end with a transversely extending slot having rigidly secured therein the transversely extending key 150, the opposite ends of which project outwardly through vertical slots 151 formed in the opposite sides of the hollow shaft 142. The arrangement is such that when the shaft 147 is forced upwardly by the upward rocking movement of the lever 138 the end portions of the key 150 will engage the shouldered portion 152 of the hub 58 to raise this head driving gear to release the same from the worm gear 60.

The construction of the cam 134 that rocks the transversely extending shaft 137 is such that these parts will occupy the position in which they are shown in Fig. 3 during the stitching operation, that is, during the period that the heads 13 are being rotated and are being acted upon at the various stations, but the arm 135 is held depressed by the cam 134 during the indexing or rotation of the turret 14 through an angle of 60°. This is best illustrated in Fig. 25 in which the direction that the male element 132 of the Geneva gear rotates is indicated. The arm 135 will be held depressed by the cam 134 while the roller 153 of the Geneva gear is being moved from the position of, say, 160° to a position of approximately 270° viewing Fig. 25, whereupon the cam 134 will permit the parts to return to the position in which they are shown in Fig. 3 under the weight of the transferrer 15.

It will be seen from the operating mechanism so far described that during the stitching operation of the machine the clutch controlling levers will occupy the position in which they are shown in Figs. 1, 5, and 23, to cause the main shaft 69 to drive the clutch mechanism 71, the Geneva gear mechanism 83, the shaft 79, and the looping mechanism, to be described, and when the parts driven by the change gear 98 have rotated the cam 105 through a complete revolution the thrust rod 113 will be actuated to disengage the bar 123 from the block 126, whereupon the clutch operating yoke 115 will be shifted by the spring 117 to release the driving mechanism, just described, and operate the bevel pinion 128 to operate the large Geneva gear and cam 134. The rotation of the bevel gear 129 and the parts operated thereby will continue until the shaft 130 has been rotated through one complete revolution whereupon the yoke arm 115 will be shifted in the opposite direction to stop driving the bevel pinion 128 and initiate rotation of the mechanism controlled by the opposite clutch 71. To accomplish this the cam 122 above described, is rigidly secured to the vertical shaft 130 and as this cam is rotated through nearly a complete revolution the flattened portion 154 thereof will be positioned opposite the roller secured at 124 to the thrust bar 123, and as a result the rocking lever 119 will be permitted to move further in a right hand direction viewing Fig. 5 under the action of the spring 117. This will cause the shoulder 125 to engage behind the block 126 so that the further rotation of the cam 122 will force the thrust bar 123 in a left hand direction viewing Fig. 5 to shift the sleeve 73 of the clutch in a left hand direction.

Having described the operating mechanism for the turret 14, transferrer 15, and the mechanism for rotating the heads 13 when carried by the turret; the mechanism for operating upon the heads 13 at the different stations II, III, IV and V will now be described.

When the portions a and b of a sock or stocking are placed upon the impaling pins 19 parts will protrude from the row of pins somewhat, as shown in Fig. 6, and it is desirable to trim these portions of the sock or stocking close to the pins so that only a single loop of each piece of fabric a and b remains about each impaling pin 19. Mechanism to this end is best shown in Figs. 6 and 7 wherein the shearing means illustrated consists of a fixed blade 155 secured to a bracket 159, adjustably mounted on the support 156 secured to the main frame 10, and cooperating with the fixed blade is the movable blade 157 which is rigidly secured to its operating shaft 158, journaled in the supporting bracket 159 and the movable blade 157 is yieldingly held in shearing engagement with the fixed blade 155 by the coiled spring 160. The operating shaft 158 is provided at its outer end with an operating arm 161, the outer end of which arm is secured to the downwardly extending lever or pitman 162 provided at its lower end with an eccentric yoke adapted to receive the eccentric 163 rigidly secured to the operating shaft 79, above described, see Fig. 2. It may be desirable to swing the cutter blade 157 upwardly from time to time to an inoperative position so that the cutting edge may be sharpened and this is readily accomplished by providing a slot and key connection between the shaft 158 and arm 161, which are normally held in locking engagement with each other by the spring 160, but which may be readily disengaged by pulling the shaft 158 by the knob thereupon to the right, viewing Fig. 5.

The cutter supporting bracket 159 is preferably mounted upon the base plate 156 for sliding adjustment in a direction to move the cutter blades towards and from the impaling pins 19 and to this end the bracket 159 is adjustably secured to the base plate 156 by the bolts 164. The adjusting bolt having the knurled head 165 is provided so that it may be rotated to slide the bracket 159 towards and from the work.

The protruding portions a and b of the fabric to be sheared may tend to curl away from the horizontal position and it is necessary to straighten these portions before presenting them to the shearing knives. This is accomplished by providing the upper and lower guides 166 and 167 which are supported slightly spaced and in parallel relation to each other so that the protruding portions of the fabric may be advanced therebetween to the shearing means. If the portions of the fabric a and b happen to be tightly curled as they approach the guides 166 and 167 they may not enter these guides properly, and in order to prevent this the bent wires or springs 168 and 169 are provided which are yieldingly supported by the posts 170 and the outer ends of these wires rest in notches formed in the guides 166 and 167, as shown in Fig. 8. The arrangement is such that during the rotation of the turret 14 a head being advanced to the shearing position will pass in close proximity to the wires 168 and 169 and the V-shaped portion of these wires shown in Fig. 8 will enter the space between the curled fabrics a and b and the adjacent head to straighten out these fabrics as they pass between the guides 166 and 167. As a result of this construction the fabrics will be properly trimmed close to the impaling pins, as shown in Fig. 6.

After the trimming operation is performed it is desirable to remove the trimmed portions of the fabrics, and this is accomplished at station III through the employment of the oscillating brush 171 which is rigidly secured to the upper end of the operating shaft 172 and this shaft, it should be noted, is supported at an inclination to the axis of the adjacent head 13. The shaft 172 is rotatably supported at the inclination just mentioned by the frame 173 supported by the upright shaft 174, the arrangement being such that the bracket 173 may be adjusted about the shaft 174 to move the brush towards and from the work. This is accomplished by mounting upon the bracket 173 the worm 175 adapted to be turned by the hand knob 176, and this worm meshes with the teeth of the fixed worm gear 177. The shaft 172 and brush 171 are rocked back and forth through a relatively small angle and this is accomplished by providing the lower end of the shaft 172 with the operating gear 178 adapted to be engaged and rotated by the gear segment 179 which segment is supported by the shaft 174 for rocking movement. Movement is imparted to the gear segment 179 from the operating shaft 79 which is provided with an eccentric adapted to operate the eccentric element 180, the outer end of which is connected to the gear segment by the ball joint 181. The arrangement just described is such that as the brush 171 is oscillated its bristles move back and forth diagonally of the fabric loops engaging the impaling pins 19 to clear these loops of all cut portions of the fabrics.

After the fabrics carried by a head 13 have been sheared and brushed they are presented to the stitching or looping mechanism of station No. IV where the portions a and b of the fabric are united as shown in Fig. 10. The uniting operation may be performed through the employment of a single thread stitch or two separate stitches may be employed, the latter construction being illustrated in the drawings. It is also desirable that a yielding type of stitch be provided for uniting the portions a and b to form a yielding joint between these portions. Stitching or looping devices adapted to perform this type of work are well known and have been employed heretofore and the looping mechanism shown in the drawings is for the most part well known but certain improvements have been made therein over the prior art.

The stitching or looping mechanism is driven in the construction shown from the bevel gear 81, driven by the portion 71 of the twin clutch. To this end is provided the operating shaft 182 for the stitching mechanism which is rotatably supported by a bracket 183 secured to the main frame 10, and at one end of this shaft is provided the bevel gear 184 adapted to mesh with the driving gear 81. The shaft 182 is provided with two eccentrics 185 and 186 adapted to operate the needle 187 and the looping needle 188 respectively. The needle 187 has the curved construction shown in Fig. 9 and is rigidly secured to the outer end of its operating arm 189, which arm is secured to and operated by the horizontally extending shaft 190. At the opposite end of the shaft 190 is provided the arm 191 which is connected to the upper end of the link 192 actuated by the eccentric 185 and the effective length of this link 192 may be adjusted by the adjustable connections and lock nuts shown. The looper needle 188 is rigidly secured to the outer end of an operating arm 193 which arm is rigidly secured to a rocking shaft 194. This shaft, it should be noted, is disposed at right angles to the shaft 190 and rocking movement is imparted to the shaft 194 by the arm 195 secured to the oposite end of the shaft. The arm 195 is connected to the upper end of the adjustable link 196 by the ball joint 197 and reciprocatory movement is imparted to this link by the eccentric 186.

The needle 187 and looper 188 and their supporting shafts are carried by the upright bracket 198 which is shown as mounted upon the supporting structure 183 for sliding adjustment towards and from the work, and to this end the base of the bracket 198 is adjustably secured to the supporting stand 183 by the clamping bolts 199 and movement of the bracket 198 towards and from the work is effected by rotating the adjusting bolt having knurled head 200.

The stitching mechanism just described may operate in a well known manner, the arrangement being such that the needle 187 is moved upwardly along each impaling pin 19, to carry the looped uniting thread 201 upwardly between the adjacent impaling pin 19 and the loops of the fabrics a and b. Each impaling pin is preferably grooved at its outer face as shown in Fig. 10 to facilitate the passage of the needle 187 between the pin and fabric loops. As the thread 201 is carried upwardly by the needle through the looped portions of the fabrics, it is engaged by the looper needle 188 at a position above the plane of the fabrics a and b and is held while the needle is withdrawn, and after the needle is withdrawn from the fabric the looping needle is advanced to form a loop in its thread which in turn is engaged and held by the needle. In this way a series of yielding looped stitches are formed in a well known manner uniting the looped portions of the fabric a and b supported by the impaling pins 19. The thread 201 may be supplied to the needle from the source of supply 202, see Fig. 3 and the thread 203 is supplied to the looping needle from a similar source of supply 204.

The stitching or uniting operation is performed upon a head until the head has been rotated through slightly more than one complete revolution, as above pointed out, whereupon the stitching operation and step by step rotation of the head is arrested and the turret 14 is indexed to present the next head 13 to the stitching device. At the same time the head just finished is advanced from the station No. IV to the station No. V position and this is done without severing the threads 201 and 203 so that these threads extend from the needles 187 and 188 to the station V position. This is desirable to prevent the threads from being cut and pulled out of the eyes of the needles when the stitching operation is started upon the next head. After a portion of the stitching operation has been completed the threads just mentioned may be cut without danger of the same pulling loose from the fabric.

One good practical form of mechanism for cutting or severing the threads just mentioned adjacent one head at the station IV position and a second adjacent the station V position will now be described. The mechanism shown to this end comprises a bracket 205 adapted to carry two cutting blades to be described, and this bracket is supported by the upright shaft 206 (see Fig. 19) which is slidably mounted in a fixed guide 207 supported by the main frame 10. The bracket 205 is shown in Fig. 19 as partially lowered. This bracket lies in close proximity to the table 14 of the turret during the looping operation but is raised sufficiently to clear the advancing head 13 during the turret indexing operation. The movement of the bracket 205 is secured by operatively connecting the sliding shaft 206 to the lower horizontal extending shaft 137 which, as above pointed out, is periodically rocked by the actuating cam 134. To this end the shaft 137 has rigidly secured thereto the laterally extending arm 208, (see Fig. 2), and the outer end of this arm has pivotally secured thereto the connecting link 209, the upper end of which is secured at 210 to an arm of the segmental gear 211, which gear is rigidly secured to the shaft 212 supported for rocking movement, and the teeth of this segmental gear engage the rack teeth of the vertical shaft 206, as clearly shown in Fig. 19. The arrangement is such that when the arm 135 is depressed by the cam 134 preparatory to indexing the turret, the arm 208 will be similarly depressed. This will rock the segmental gear 211 upwardly to raise the shaft 206 to move the bracket 205 at the upper end of this shaft out of the path of the head 13 being moved at this time to station V by the turret.

In the construction shown the knife supporting bracket 205 is provided with two razor blades 213 and 214 each of which is held by a suitably constructed holder as best shown in Fig. 19, and one of these razor blades is supported adjacent the head 13 at station V, while the other is supported adjacent the head at station IV.

To facilitate the severing of the threads 201 and 203 extending between the heads 13, just mentioned, it is desirable to clamp these threads between the heads, and this is accomplished in accordance with the present invention by providing upon the upper face of the turret 14 the clamping blocks 215 and by providing upon the bracket 205 the spring pressed plungers 216 and 217, for clamping the threads against the blocks 215. The arangement is such that when the bracket 205 is lowered the threads will be clamped near each head 13, as clearly shown in Fig. 27, and while the threads are held clamped the rotation of the heads 13 will carry the threads to be severed against the knives 213 and 214 to thereby sever the threads adjacent each head. As a result of this construction it should be noted that the threads extending from the head in the station IV position are not severed until this head has been rotated through an angle of approximately 90°, thus insuring that the looping or uniting operation will have been advanced sufficiently to firmly secure the threads to the fabrics before the threads are severed.

It is further desirable to provide slack in the threads extending from the clamping means 217 to the eye of the needle and looping needle so that these needles will operate properly as they begin operating upon the next head 13. This desired slack is produced in the construction shown by providing the bracket 205 with a vertically movable rack or plunger 218 which is normally held in its depressed or lowered position by a spring, not shown. The teeth of the rack 218 mesh with a gear 219, (see Fig. 19), which gear is rigidly secured to a horizontally extending shaft 220 journaled in the bracket 205 and at the outer end of this shaft is rigidly secured the arm 221. Above the arm 221 is mounted a second arm 222, (see Fig. 26) and this second arm is supported at 223 for rocking movement. To the outer end of each of the arms 221 and 222 is pivotally secured the thread deflecting bar 224. The arrangement is such that as the cutter supporting bracket 205 is lowered the rack 218 will be forced upwardly by its engagement with the turret. This will rotate the arm 221 and also the arm 222 through the connection link 224 therebetween, with the result that the link will be moved laterally from the position in which it is shown in dotted lines of Fig. 19, to the position in which it is shown in full lines of Fig. 26, thus forcing or deflecting the threads 201 and 203 laterally to produce the desired slack.

As above pointed out when the uniting operation is finished upon one head this head is advanced to the next station without severing the threads, but in order that this may be done it is necessary to position both needles 187 and 188 so that the threads may pull freely through the eyes of the needles. It is therefore necessary to bring the needles to rest in a predetermined position each time the stitching operation is stopped to permit indexing of the turret. A further feature of the present invention therefore resides in means for bringing the needles to rest in the desired predetermined position. This is accomplished in the embodiment of the invention illustrated by providing means for rotating the needle operating shaft 182 in the reverse direction through a part of a revolution as the stitching machine is brought to rest.

To this end in the construction shown the needle operating shaft 182 has rigidly secured thereto the rotating ratchet 225, having the shoulder best shown in Fig. 9, and which is adapted to be engaged by the pawl 226. This pawl is pivotally mounted at 227 upon an arm 228 provided upon the sleeve 229. This sleeve 229 is loosely mounted upon the drive shaft 182 and is provided at one end with the segmental gear 230, see Fig. 5.

The sleeve 229 is normally held turned to the right hand position in which it is shown in dotted lines in Fig. 9, and the pawl 226 is normally held rocked away from the revolving ratchet 225 by the pawl supporting plate 231, carried at the upper end of the lever 232 which is pivotally supported at 233. The position of the lever 232 is controlled by the clutch shifting yoke 115 and to accomplish this the yoke 115 is provided at its outer end with a spring operated plunger 234 adapted to shift an arm 235 of a bell crank lever pivoted at 236, see Fig. 5. The second arm 237 of this lever is connected by the link 238 to the lower end of the pawl supporting lever 232. The arrangement is such that when the clutch actuating yoke 115 is shifted in a right hand direction viewing Fig. 5 to index the turret the bell crank lever just mentioned will be rocked to move the pawl supporting plate 231 away from the pawl, whereupon this pawl will rock toward the rotating ratchet to engage the shoulder upon this ratchet and thereby arrest the rotation of the shaft 182. While the pawl 226 remains in engagement with the shoulder upon the ratchet 225 the pawl supporting sleeve 229 is rocked in a contra clockwise direction viewing Fig. 9 to move the pawl to the left hand position in which it is shown in Fig. 9. This serves to rotate the needle operating shaft 182 in the reversed direction through an angle of approximately 90° and serves to remove the needles from the work and out of the loops formed in the threads so that the threads may pass freely through the eyes of the needles as a head 13 is being advanced from station IV to station V.

The desired rotation of the sleeve 229 just mentioned is secured in the construction shown by utilizing the rocking movement of the segmental gear 211 to rotate the sleeve 229. Since the shaft 212 is rigidly secured to the segmental gear 211, as above mentioned, the rocking movement of the gear is imparted to the shaft 212 and to the outer end of this shaft is secured a segmental gear 239, see Figs. 5 and 19. The arrangement is such that the downward rocking movement of the arm 135 under the action of the cam 134 serves to operate the segmental gear 239 so as to turn the pawl carrying sleeve 229 in a direction to shift the pawl from the right hand position of Fig. 9 to the left hand position of this figure to thereby rotate the shaft 182 in the reversed direction. The movement of the sleeve 229 just mentioned serves also to actuate the thread tensioning devices 240 and 241 to release the tension upon their respective threads 201 and 203. This is accomplished by providing adjacent each of these tensioning devices the yarn releasing arms 242 adapted to be swung upwardly by the rocking movement of their supporting shaft 243 to a position between the tensioning discs 240 to force these discs apart. The desired movement is imparted to the yarn releasing arms 242 by providing the shaft 243 which supports these arms with an oppositely extending operating arm having connected thereto the upper end of the link 244. The lower end of this link is connected to the arm 228 to be actuated by the rocking movement of the sleeve.

It is important that the turret each time it is indexed be firmly held against movement during the entire stitching or looping operation. This is accomplished by providing in the outer periphery of the turret 14 the bolt recesses 245 adapted to receive a vertical sliding bolt 246 carried by the shaft 206, the arrangement being such that when the shaft 206 is lowered the bolt will be moved thereby downwardly into snug locking engagement with hardened blocks 246$^x$ one of which is rigidly secured to the turret and the other is rigidly secured to the bracket 207. These blocks are constructed to snugly receive the locking bolt 246 to effect the desired positive locking engagement between the rotating turret and fixed frame.

After a head 13 has been carried by the turret 14 successively to the different stations numbered I and VI inclusive it is conveyed by the transferror 15 from the station VI position to the "out" position, as above pointed out. In the construction shown the heads 13 are conveyer away from the "out" position by the sprocket chains 247 which are preferably provided with the upwardly extending projections 248 adapted to engage the annular flange 18 of each head to move the heads away from the looping mechanism as indicated by the arrow in Fig. 3.

The chains 247 and the belts 23 are conveniently driven in the construction shown from the gear 34, which as above pointed out, is driven from the ring gear 33, and to this end the supporting structure 12 of the machine is provided with the vertically disposed gear supporting shaft 249 adapted to rotatably support the gear 250 which meshes with and is driven by the gear 34, see Fig. 3. The gear 250 has the bevel pinion 251 adapted to drive in opposite directions the spaced bevel gears 252 and 253. The gear 252 drives the pulleys 24 for the belt 23 in a direction to supply the heads 13 to the "in" position, and the bevel gear 253 drives the chains 247 in the opposite direction to move the heads away from the "out" position. The parts just mentioned are journaled upon the shaft 25.

As above pointed out the yarns 201 and 203 are cut adjacent the heads 13 while they are held clamped against the upper face of the turret by the spring pressed plungers 216 and 217. It is desirable to remove these cut threads from the surface of the revolving turret. This is readily accomplished in accordance with the present invention by providing adjacent the revolving transferrer 15 the laterally extending arms 254, see Fig. 1, and at the outer end of each arm is provided the downwardly extending brush, best shown in Fig. 2, adapted to be moved over a portion of the upper surface of the turret 14 each time the transferrer is rotated.

It is desirable to support and rotate the brushes with the transferrer 15 without imparting the raising and lowering movement of the transferrer to the brushes. This is readily accomplished by rigidly securing to the transferrer driving gear 34 the upwardly extending sleeve 255 to which the brush supporting arms 254 are rigidly secured.

The threads which are swept from the surface of the turret by the revolving brushes just mentioned may be removed from these brushes by causing the bristles thereof to pass through the upwardly extending pins of a block or comb 256 secured in a fixed position upon the supporting structure 12.

Since the machine of the present invention is designed to perform the various required operations upon one head after another automatically it is important to provide stop mechanism for stopping the operation of the machine in case work is not presented to the desired position, or if other defects occur in the operation of the machine. To take care of these conditions the present invention contemplates the provision of one stop mechanism for stopping the machine in case a head 13 is not presented at the proper time at the "in" position. A second stop mechanism is provided for stopping the operation of the machine in case the head 13 is not moved downwardly into proper locking engagement with its rotating sleeve 55 as the head approaches the trimming mechanism. The present invention also contemplates stop mechanism for stopping the machine in case the thread supplied to the needle 187 or the looping needle 138 breaks or becomes too slack, or in case a knot is formed in a thread supplied to either of these needles.

The first stop mechanism just referred to, in the construction shown, comprises a slide 257 supported by the frame 12 and is adapted to be pushed frontwardly by a head 13 when such head is properly placed in the "in" position. The slide 257 is adapted to control the position of a laterally extending arm 258 pivotally supported at 259, the arrangement being such that when the slide detects the presence of a head 13 in the desired position and is pushed frontwardly by such head this movement will serve to position the arm 258, as shown in Fig. 1ª, so that the arm 258 will not be struck by the downwardly extending projection 260 carried by the transferrer 15. If, however, a head 13 is not properly placed at the "in" position when the transferrer 15 is lowered to pick up such head, the arm 258 will at this time remain in the dotted line position of Fig. 1ª, so that it will be struck and rocked downwardly by the projection 260. This will serve to rock the shaft 261 which is provided with a downwardly extending arm 262 to the lower end of which is connected the rod 263. This rocking movement will serve to pull the rod 263 in the direction of its length and this movement of the rod 263 will rock the transversely extending shaft 264 which stops the machine in a manner to be described.

As above pointed out a slot and key driving connection is provided between the heads 13 and the rotating sleeves provided upon the turret to turn the heads, and it is desirable to provide means for stopping the machine in case a head is not lowered into proper driving engagement with the sleeve. The stopping mechanism provided in accordance with the present invention to take care of this condition resides in a pivoted finger 265 rigidly secured to the shaft 266 rockingly supported by the bracket 156, the arrangement being such that the inner end of the finger 265 will be struck by the flange 18 of a head in case the head is not lowered properly into its sleeve as the head is advanced from the position I to the position II. If the head is not properly positioned the engagement of the flange thereof with the finger 265 will serve to rock the shaft 266. This will pull the link 267 connected to the shaft in a direction to rock the transversely extending shaft 264.

As above stated it is desirable to provide means controlled by the threads 201 and 203 to stop the machine in case either thread breaks or a knot is formed in the thread. The means shown for accomplishing this comprises a transversely extending shaft 268 which is journaled in oppositely extending projections 198ª upon the frame 198 of the stitching device. Loosely mounted upon the shaft 268 near each end thereof are provided means controlled by the tension of the threads 201 and 203 to stop the machine in case a thread breaks or becomes too slack. Each of these means comprises a hub loosely journaled upon the shaft 268 and having a horizontal arm 269 provided with an adjustable weight 270. Extending upwardly from one of the hubs is the lever 271 having a laterally extending portion that rests against the thread 201, and the other hub has a similar upwardly extending lever 272 that engages the thread 203. The arrangement is such that as long as the threads extending around the guides 273 and 274 are properly tensioned the weights 270 will be held elevated by the levers 271 and 272, as shown in Fig. 9, but if one of these threads breaks or becomes too slack the weight controlled thereby will move downwardly. This will turn the shaft 268 to actuate the arm 275 and operate stopping mechanism to be described. The rotative movement of each weight arm is imparted to the shaft 268 by the engagement of a pin carried by the hub of the weight arm with a blade-like abutment 276, there being one of these abutments rigidly secured to each end of the shaft 268.

If a knot is formed in either thread 201 or 203 a similar rocking movement will be imparted to the shaft 268 to stop the machine, due to the fact that the shaft 268 has loosely mounted thereupon the downwardly extending arms 277 and 278, each of which has a thread receiving slot through which the thread may pass freely but which will not permit the passage of a knot. The hub of each arm 277 and 278 has a pin adapted to engage one of the abutments 276 of the shaft 268 to turn this shaft and stop the machine in case either arm 277, 278 is shifted by the travel of a knotted thread. It will, therefore, be seen that the shaft 268 is under the control of each of the four levers 271, 272, 277 and 278.

The several stopping devices above described all serve to control the weight supporting hook 279 which is journalled upon the shaft 264. The hook 279 is normally held in the operative position in which it is shown in Fig. 16 by the weight of its laterally extending arm 280 and the hook serves to support the weight 281 which is pivoted at 282 in the horizontal position, the arrangement being such that when the hook is moved out of engagement with the weight 281 the latter moves downwardly into the inclined position in which it is shown in dotted lines in Fig. 16, so that it will lie in the path of the rotating pin 283, which extends laterally from the sleeve or clutch element 70 that is slidably mounted upon the power shaft 69 and is keyed thereto to drive this shaft from the pulley 68. The arrangement is such that when the latch 279 is disengaged from the weight 281 the latter will move downwardly into a position to cause the rotating pin 283 to engage the sloping surface 284 of the weight. This will force the sleeve or clutch element 70 away from the pulley 68 to stop the rotation of the power shaft 69.

The hook 279 is preferably loosely connected to its operating shaft 264 by the slot and groove connection 285, see Fig. 5, the arrangement being such that rotation of the shaft 264 under the control of the finger 265 or the sliding feeler 257 will rock this shaft to release the hook from the weight and stop the machine. On the other hand the latch 279 may be actuated by the thread control shaft 268 and connections to be described, to disengage the latch from its weight without rocking the shaft 264. The arm 275 which extends laterally from the rock shaft 268 is connected to the lower rocking shaft 276 by the link 286. The opposite end of the shaft 276 is provided with the laterally extending arm 287, the outer end of which engages the tail portion 280 of the hook 279. The arrangement is such that when the shaft 268 is rocked upon the occurrence of a defect in either thread 201 or 203 the link 286 will be forced downwardly to rock the shaft 276. This will raise the arm 287 to disengage the hook 279 from the weight and stop the machine.

The sleeve or clutch element 70 for driving the shaft 69 from the pulley 68 in addition to being controlled by the stop mechanism just described is also provided with means for manually shifting the sleeve to and from the shaft driving position, and to this end the rock shaft 288 is provided having the upwardly extending handles 289 at its opposite ends and extending upwardly from the shaft 288 is a yoke having the clutch shifting fingers 290. It may be desirable to control the starting and stopping of the machine from the opposite side of the machine frame from that of the handles 289 and this is accomplished by providing the transversely extending rod 291, one end of which is secured to a rocking arm 292 extending downwardly from the shaft 288 and the opposite end of the rod 291 is provided with a hand knob 293 adapted to be engaged by the hand to shift the rod in the direction of its length to control the clutch 70.

Having described the various groups of mechanism of the present invention and the means for operating these various devices the operation of the present invention may be briefly described as follows:

The heads carrying the hosiery portions to be united are advanced by the belts 23 towards the "in" position. These heads are conveyed one at a time from the "in" position to position No. I of the rotating turret and at the same time a completed head is conveyed by the transferrer from the station VI position of the turret to the "out" position. This is accomplished by raising the transferrer, rotating it through 180° and again lowering it. The heads, while they are supported by the turret are rotated step by step through short intervals equal to the distance between the impaling pins 19 to present the successive pins opposite the stitching needle. As soon as the stitching or looping operation is completed upon one head the rotation of the head is suspended while the turret is rotated through an angle of 60° to present the next head to the stitching mechanism. This indexing or rotation of the turret is effected by the lower or larger Geneva gear, best shown in Figs. 3 and 25.

The various operating parts of the machine are driven from the main shaft 69 provided with the twin clutches 71, 72 one of which operates the turret rotating mechanism, and the other drives the stitching mechanism and rotates the heads 13. After the operation upon a head is completed and it is delivered by the transferrer 15 from the position VI to the "out" position it is carried from the "out" position by the chains 247.

What is claimed is:

1. In a machine for uniting looped fabrics, in combination, heads having impaling pins for the fabrics, stitching mechanism, operating means therefor, a carrier for supporting the heads and advancing them to different points of operation, means for presenting the heads to a transfer point, and a transferrer for delivering the heads from the transfer point onto said carrier.

2. In a machine for uniting looped fabrics, in combination, annular heads having impaling pins for the fabrics, a rotating carrier or turret having means for supporting a plurality of heads and provided with mechanism for rotating each head about its own axis, means for rotating the carrier or turret periodically to advance the heads to different points of operation, and means for automatically placing the heads upon the carrier or turret.

3. In a machine for uniting looped fabrics, in combination, annular heads having impaling pins for the fabrics, a rotating carrier or turret having means for supporting a plurality of heads and provided with mechanism for rotating each head about its own axis, means for rotating the carrier or turret periodically to advance the heads to different points of operation, and means for automatically removing the heads from the carrier or turret.

4. In a machine for uniting looped fabrics, in combination, annular heads having impaling pins for the fabrics, a rotating carrier or turret having means for supporting a plurality of heads and provided with mechanism for rotating each head about its own axis, means for rotating the carrier or turret periodically to advance the heads to different points of operation, and means for automatically placing the heads upon the carrier or turret and for removing them therefrom.

5. In a machine for uniting looped fabrics, in combination, annular heads having impaling pins, a rotating carrier for supporting a plurality of heads, stitching mechanism, means for periodically turning the carrier to present the heads successively to the stitching mechanism, means for turning the head adjacent the stitching mechanism about its own axis, and mechanism for automatically starting and stopping the operation of the carrier turning means and head turning means so that each is inoperative while the other operates.

6. In a machine for uniting looped fabrics, in combination, annular heads having impaling pins, a rotating carrier for supporting a plurality of heads, stitching mechanism, means for rotating a head about its own axis while adjacent the stitching mechanism, and automatic means operable upon the completion of uniting the fabrics upon one head to rotate the carrier to present another head to the stitching mechanism.

7. In a machine for uniting looped fabrics, in combination, annular heads having impaling pins, a carrier for supporting a plurality of heads, stitching mechanism means for periodically actuating the carrier to present the heads successively to the stitching mechanism, and mechanism operable to turn the head adjacent the stitching mechanism through one revolution and then operate the carrier to present the next head to the stitching mechanism.

8. In a machine for uniting looped fabrics, in combination, annular heads having impaling pins, a carrier for supporting a plurality of heads, stitching mechanism, power means for periodically actuating the carrier to present the heads successively to the stitching mechanism, mechanism operable to turn the head adjacent the stitching mechanism through one revolution and then stop the rotation of this head, and means for preventing the power actuation of the carrier during the operation of said head turning mechanism.

9. In a machine for uniting looped fabrics, in combination, annular heads having impaling pins, a carrier for supporting a plurality of heads, stitching mechanism, means for periodically actuating the carrier to present the heads successively to the stitching mechanism, mechanism operable to turn the head adjacent the stitching mechanism through one revolution and then stop the rotation of the head and effect movement of the carrier to present the next head to the stitching mechanism.

10. In a machine for uniting looped fabrics, in combination, annular heads having impaling pins, stitching mechanism, a carrier for presenting the heads successively to the stitching mechanism, head receiving sleeves rotatably mounted upon the carrier to rotate the heads adjacent the stitching mechanism, means for rotating said sleeves, and power actuated means for inserting a head in one sleeve and for removing a head from another sleeve.

11. In a machine for uniting looped fabrics, in combination, annular heads having impaling pins, stitching mechanism, a rotating carrier for presenting the head successively to the stitching mechanism, head receiving sleeves rotatably mounted upon the carrier to rotate the heads adjacent the stitching mechanism, means for rotating said sleeves, means for periodically rotating the carrier, and power operated means for placing heads in the sleeves.

12. In a machine for uniting looped fabrics, in combination, annular heads having impaling pins, stitching mechanism, a head supporting carrier operable to present heads successively to the stitching mechanism, sleeves rotatably mounted upon the carrier to removably receive the heads, and power operated means for removing a head that has been acted upon by the stitching mechanism from the sleeve and for inserting another head therein.

13. In a machine for uniting looped fabrics, in combination, a carrier provided with rotating sleeves, annular fabric supporting heads removably mounted in the sleeves, means for effecting a positive locking engagement between a sleeve and the head inserted therein, stitching mechanism, means for rotating the sleeves adjacent the stitching mechanism, and means for effecting a relative turning movement between a sleeve and the head therein to bring the locking parts into locking engagement.

14. In a machine for uniting looped fabrics, in combination, annular heads having impaling pins, stitching mechanism, a rotating carrier for presenting the heads successively to the stitching mechanism, means for periodically rotating said carrier, means for rotating a head adjacent the stitching mechanism, a pair of clutches one for operating each of said means, and mechanism for shifting the drive alternately from one clutch to the other at the end of predetermined cycles.

15. In a machine for uniting looped fabrics, in combination, annular heads having impaling pins, stitching mechanism, a rotating carrier for presenting the heads successively to the stitching mechanism, power operated mechanism for rotating a head step by step adjacent the stitching mechanism, Geneva gear mechanism for rotating the carrier, and means for stopping the operation of one of said mechanisms and starting the other at the end of each cycle of operations.

16. In a machine for uniting looped fabrics, in combination, annular heads having impaling pins, stitching mechanism, a rotating carrier for presenting the heads successively to the stitching mechanism, power means for rotating the heads and for operating the stitching mechanism, power means for rotating the carrier through successive angles, and mechanism for controlling each of said power means to cause first one to perform its cycle of operations and then the other.

17. In a machine for uniting looped fabrics, in combination, annular heads having impaling pins, shearing mechanism and stitching mechanism, a rotating carrier for presenting the heads successively to said mechanisms, means for rotating said carrier through successive angles, means for rotating the heads and for operating the shearing and stitching mechanism, and mechanism for controlling each of said means to cause first one to operate and then the other.

18. In a machine for uniting looped fabrics, in combination, annular heads having impaling pins, stitching mechanism, a carrier for presenting the heads successively to the stitching mechanism, means for rotating a head adjacent the stitching mechanism, a transferrer for delivering the heads to the carrier, and means for rotating the transferrer to position a head over a portion of the carrier and for then lowering the transferrer to deposit the head upon the carrier.

19. In a machine for uniting looped fabrics, in combination, annular heads having impaling pins, stitching mechanism, a carrier for presenting the heads successively to the stitching mechanism, means for rotating a head adjacent the stitching mechanism, a transferrer for removing heads from the carrier, and means operable to lower the transferrer into engagement with a head then lift the head and swing it away from the carrier.

20. In a machine for uniting looped fabrics, in combination, annular heads having impaling pins, stitching mechanism, a carrier for presenting the heads successively to the stitching mechanism, means for rotating a head adjacent the stitching mechanism, and a transferrer operable to supply heads to the carrier and remove them therefrom.

21. In a machine for uniting looped fabrics in combination, annular heads having impaling pins, stitching mechanism, a carrier for presenting the heads successively to the stitching mechanism, means for rotating a head adjacent the stitching mechanism, a transferrer operable to supply heads to the carrier and remove them therefrom, means for rotating the transferrer to position a head carried thereby over a portion of the carrier, means for lowering the transferrer to deposit its head upon the carrier and for engaging another head thereupon, and means for raising the carrier to remove the last mentioned head from the carrier.

22. In a machine for uniting looped fabrics, in combination, annular heads having impaling pins, stitching mechanism, a carrier adapted to support several heads and present them successively to the stitching mechanism, means for rotating the heads, a transferrer for supplying heads to the carrier and for removing them therefrom, and means for moving the transferrer to and from a position over part of the carrier and for raising and lowering the transferrer relative to the carrier.

23. In a machine for uniting looped fabrics, in combination, annular heads having impaling pins, stitching mechanism, a carrier adapted to support several heads and present them successively to the stitching mechanism, means for rotating the heads, a transferrer for supplying heads to the carrier and for removing them therefrom, and provided with a holder for a head to be placed upon the carrier and a second holder for engaging a head and removing it from the carrier, and means for operating the transferrer.

24. In a machine for uniting looped fabrics, in combination, annular heads having impaling pins, stitching mechanism, a carrier adapted to support several heads and present them successively to the stitching mechanism, means for rotating the heads, a transferrer for supplying heads to the carrier and for removing them therefrom, and provided with a holder for a head to be placed upon the carrier and a second holder for engaging an adjacent head to be removed from the carrier, and means for rotating the transferrer and for lowering and raising it relative to the carrier.

25. In a machine for uniting looped fabrics, in combination, annular heads having impaling pins, stitching mechanism, a revolving carrier having several head receiving sleeves rotatable upon the carrier, means for rotating the carrier to present the heads to the stitching mechanism, means for rotating the sleeves, a transferrer for supplying heads to the carrier and for removing them therefrom and provided with a holder for a head to be placed in a carrier sleeve and a second holder for engaging a head to be removed from a carrier sleeve, and means for moving the transferrer relative to the carrier.

26. In a machine for uniting looped fabrics, in combination, annular heads having impaling pins, stitching mechanism, a revolving carrier having several head receiving sleeves rotatable upon the carrier, means for rotating the carrier to present the heads to the stitching mechanism, means for rotating the sleeves, a transferrer for supplying heads to the carrier and for removing them therefrom and provided with a holder for a head to be placed in a carrier sleeve and a second holder for engaging a head to be removed from a carrier sleeve, and means for rotating the transferrer to position its holders above two of said sleeves and for lowering the transferrer to place one head in a sleeve and to engage the head in the other sleeve.

27. In a machine for uniting looped fabrics, in combination, annular heads having impaling pins, stitching mechanism, a carrier for presenting the heads successively to the stitching mechanism, means for rotating the heads, means for delivering heads to the carrier and for removing them therefrom comprising a transferrer provided with four head receiving holders, means for rotating the transferrer to position one head upon the carrier and remove another head therefrom, and means for lowering the transferrer to deposit one head upon the carrier and for raising the transferrer to remove a second head from the carrier.

28. In a machine for uniting looped fabrics, in combination, annular heads having impaling pins, stitching mechanism, a carrier for presenting the heads successively to the stitching mechanism, means for rotating the heads, means for delivering heads to the carrier and for removing them therefrom comprising a transferrer provided with four head receiving holders, means for rotating the transferrer through an angle of 130° to position first one pair of holders and then the other pair over the carrier, and means for actuating the transferrer to cause one holder over the carrier to release its head and the other holder to pick up a head.

29. In a machine for uniting looped fabrics, in combination, annular heads having impaling pins, stitching mechanism, a revolving carrier for the heads, means for periodically rotating the carrier to present the heads successively to the stitching mechanism, means for rotating the heads, a transferrer provided with head receiving holders one for delivering a head to the carrier and another for removing a head therefrom, and means for normally holding the transferrer in position to engage the head to be removed from the carrier and operable to hold the transferrer away from the carrier while the latter is being rotated.

30. In a machine for uniting looped fabrics, in combination, heads having impaling pins and provided with an annular flange, stitching mechanism, a carrier for presenting the heads successively to the stitching mechanism, and means for delivering the heads to the carrier comprising a transferrer having pawls adapted to engage under said flange to support the head while it is being conveyed to the carrier.

31. In a machine for uniting looped fabrics, in combination, heads having impaling pins and provided with an annular flange, stitching mechanism, a carrier for presenting the heads successively to the stitching mechanism, and means for delivering the heads to the carrier comprising a transferrer having pawls adapted to engage under said flange to support the head while it is being conveyed to the carrier, and means for releasing the pawls from said flange as the head is deposited upon the carrier.

32. In a machine for uniting looped fabrics, in combination, heads having impaling pins and provided with an annular flange, stitching mechanism, a carrier for presenting the heads successively to the stitching mechanism, and means for delivering the heads to the carrier comprising a transferrer having pawls adapted to engage under said flange to support the head while it is being conveyed to the carrier, means for releasing the pawls from said flange as the head is deposited upon the carrier, and latches for holding the pawls retracted.

33. In a machine for uniting looped fabrics, in combination, heads having impaling pins and provided with pawl engaging means, stitching mechanism, a carrier for presenting the heads successively to the stitching mechanism, and means for moving the heads bodily relative to the carrier, comprising a transferrer having pawls adapted to support a head during its transfer, and means for actuating a transferrer to engage its pawls with a head.

34. In a machine for uniting looped fabrics, in combination, heads having impaling pins and provided with pawl engaging means, stitching mechanism, a carrier for presenting the heads successively to the stitching mechanism, and means for moving the heads bodily relative to the carrier, comprising a transferrer having pawls adapted to support a head during its transfer, and means for actuating the pawls to cause them to first engage a head and later release the head.

35. In a machine for uniting looped fabrics, in combination, heads having impaling pins and provided with pawl engaging means, stitching mechanism, a carrier for presenting the heads successively to the stitching mechanism, and means for moving the heads bodily relative to the carrier, comprising a transferrer having pawls adapted to support a head during its transfer, means for engaging the pawls with a head, means for retracting the pawls to release a head, latches for holding the pawls retracted, and means for actuating the latches to release the pawls.

36. In a machine for uniting looped fabrics, in combination, heads having impaling pins and provided with pawl engaging means, stitching mechanism, a carrier for presenting the heads successively to the stitching mechanism, and means for moving the heads to and from the carrier, comprising a transferrer mounted for up and down movement and having head supporting pawls, and means controlled by the upper and downward movement of the transferrer to engage the pawls with one head and disengage other pawls from a second head.

37. In a machine for uniting looped fabrics, in combination, heads having impaling pins, stitching mechanism, a rotating carrier, means for rotating the carrier to present the heads successively to the stitching mechanism, a rotating transferrer for delivering heads to the carrier, feed means for presenting the heads to the transferrer, and means for utilizing the rotative movement of the carrier to periodically rotate the transferrer.

38. In a machine for uniting looped fabrics, in combination, heads having fabric impaling pins, a revolving carrier for the heads, stitching mechanism for uniting the fabrics carried by the head, means for periodically rotating the carrier to present the heads successively to the stitching mechanism, means for rotating the heads, means for severing the fabric uniting thread upon completion of the uniting operation, and power actuated mechanism for shifting the severing means out of the path of a head advanced by the revolving carrier.

39. In a machine for uniting looped fabrics, in combination, heads having fabric impaling pins, a revolving carrier for the heads, stitching mechanism for uniting the fabrics carried by the head, means for rotating the heads, means for periodically rotating the carrier to advance the heads to different points of operation and adapted to move a head from the stitching mechanism to the next point of operation with the thread extending thereto from the stitching needle, means for severing said thread, and power actuated means for moving the severing means out of the path of the advancing head.

40. In a machine for uniting looped fabrics, in combination, heads having fabric impaling pins, a revolving carrier for the heads, stitching mechanism for uniting the fabrics carried by a head, means for rotating the heads, means for periodically rotating the carrier to advance the heads to different points of operation and adapted to move a head from the stitching mechanism to the next point of operation with the thread extending thereto from the stitching needle, means for clamping said thread between the last mentioned head and needle and supported for movement into and out of the path traveled by said head, and means for severing the clamped thread.

41. In a machine for uniting looped fabrics, in combination, heads having fabric impaling pins, a carrier for the heads, stitching mechanism for uniting the fabrics carried by a head, means for rotating the heads, power means for operating the carrier upon completion of the uniting operation to move a head from the stitching mechanism to a point beyond with the thread extending thereto from the stitching needle, and means associated with said power means for bringing the needle to rest in its retracted position.

42. In a machine for uniting looped fabrics, in combination, heads having fabric impaling pins, a carrier for the heads, stitching mechanism for uniting the fabrics carried by a head, means for rotating the heads, power mechanism for operating the carrier to move a head upon completion of the uniting operation from the stitching mechanism to a point beyond with the thread extending thereto from the stitching needle, mechanism for clamping this thread between the needle and last mentioned head, and means for severing the clamped thread near the last mentioned head and also near the head at the stitching mechanism.

43. In a machine for uniting looped fabrics, in combination, heads having fabric impaling pins, a carrier for the heads, stitching mechanism having a needle and a needle operating shaft, means for rotating a head adjacent the needle, means for actuating the carrier to advance the heads successively to the needle, and means for bringing the needle operating shaft to rest in a predetermined position upon the completion of each uniting operation.

44. In a machine for uniting looped fabrics, in combination, heads having fabric impaling pins, a carrier for the heads, stitching mechanism having a needle and a needle operating shaft, means for rotating a head adjacent the needle, means for actuating the carrier to advance the heads successively to the needle, and means for rotating the needle operating shaft in the reverse direction upon the completion of a uniting operation.

45. In a machine for uniting looped fabrics, in combination, heads having fabric impaling pins, a carrier for the heads, stitching mechanism having a needle and a needle operating shaft, means for rotating a head adjacent the needle, means for actuating the carrier to advance the heads successively to the needle, and means for rotating the needle operating shaft in the reverse direction through part of a revolution to disengage the needle from a thread loop.

46. In a machine for uniting looped fabrics, in combination, heads having fabric impaling pins, a carrier for the heads, stitching mechanism having a needle and a needle operating shaft, means for rotating a head adjacent the needle, means for actuating the carrier to advance the heads successively to the needle, and pawl means for turning the needle operating shaft in the reverse direction upon completion of the uniting operation.

47. In a machine for uniting looped fabrics, in combination, heads having fabric impaling pins, a carrier for the heads, stitching mechanism having a needle and a needle operating shaft, means for rotating a head adjacent the needle, mechanism for operating the carrier to advance the heads successively to the stitching mechanism and adapted to move a finished head away from this position with the thread extending thereto from the needle, and means for rotating the needle shaft in the reverse direction to position the needle so that the thread may be pulled freely therethrough by the travel of the last mentioned head.

48. In a machine for uniting looped fabrics, in combination, heads having fabric impaling pins, a rotating carrier for the heads, stitching mechanism, means for rotating a head adjacent the stitching mechanism, mechanism for periodically rotating the carrier to present the heads successively to the stitching mechanism and operable to advance a finished head from this position with the fabric uniting thread extending therefrom, and a cutter positioned so that the thread extendng from a rotating head will be carried against the cutter by the rotation of the head.

49. In a machine for uniting looped fabrics, in combination, heads having fabric impaling pins, a rotating carrier for the heads, stitching mechanism, means for rotating a head adjacent the stitching mechanism, mechanism for periodically rotating the carrier to present the heads successively to the stitching mechanism and operable to advance a finished head from this position with the fabric uniting thread extending therefrom, means for holding the thread between the last mentioned head and needle, and a cutter positioned so that this thread will be severed by the rotation of the head at the stitching mechanism in a direction to force the thread against the cutter.

50. In a machine for uniting looped fabrics, in combination, heads having fabric impaling pins, a rotating carrier for the heads operable to advance the heads successively to different points of operation, means for periodically rotating the carrier, stitching mechanism, means for rotating the carrier to move a finished head from the stitching mechanism with the stitching thread attached, means for severing this thread, and means for moving the severing means into and out of the path traveled by the heads.

51. In a machine for uniting looped fabrics, in combination, annular heads having fabric impaling pins, a carrier for the heads provided with means for rotatably supporting the heads, stitching mechanism, power means for operating the carrier to present the heads successively to the stitching mechanism and for rotating the heads, and stop mechanism adapted to be operated by a head that is improperly positioned on the carrier to stop the operating mechanism.

52. In a machine for uniting looped fabrics, in combination, heads having fabric impaling pins, a carrier for the heads, stitching mechanism, power means for periodically operating the carrier to present the heads successively to the stitching mechanism and for rotating the heads, means for conveying heads to a transfer point, a transferrer for conveying the heads from said point to the carrier, and stop mechanism adapted to stop said operating mechanism upon failure of a head to be delivered to said transfer point.

53. In a machine for uniting looped fabrics, in combination, annular heads having fabric impaling pins, stitching mechanism having a stitching needle, a carrier for supporting a head adjacent the needle, power means for rotating the head and for operating the stitching mechanism, means for operating the carrier to present heads successively to the stitching mechanism, a thread tensioner, and means operable automatically to relieve the thread from the action of the thread tensioner during the movement of said carrier.

GERTRUDE VAGLER.